(12) United States Patent
Zhu et al.

(10) Patent No.: US 12,141,699 B2
(45) Date of Patent: Nov. 12, 2024

(54) SYSTEMS AND METHODS FOR PROVIDING VECTOR-WISE SPARSITY IN A NEURAL NETWORK

(71) Applicant: ALIBABA GROUP HOLDING LIMITED, Grand Cayman (KY)

(72) Inventors: Maohua Zhu, Sunnyvale, CA (US); Tao Zhang, Sunnyvale, CA (US); Zhenyu Gu, Sunnyvale, CA (US); Yuan Xie, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 642 days.

(21) Appl. No.: 16/937,202

(22) Filed: Jul. 23, 2020

(65) Prior Publication Data
US 2021/0065005 A1    Mar. 4, 2021

Related U.S. Application Data

(60) Provisional application No. 62/893,768, filed on Aug. 29, 2019.

(51) Int. Cl.
*G06N 3/082* (2023.01)
*G06F 17/16* (2006.01)
*G06N 3/048* (2023.01)
*G06N 3/084* (2023.01)

(52) U.S. Cl.
CPC ............. *G06N 3/082* (2013.01); *G06F 17/16* (2013.01); *G06N 3/048* (2023.01); *G06N 3/084* (2013.01)

(58) Field of Classification Search
CPC ........ G06N 3/082; G06N 3/048; G06N 3/084; G06F 17/16

USPC .......................................................... 706/25
See application file for complete search history.

(56) References Cited

U.S. PATENT DOCUMENTS

| | | | |
|---|---|---|---|
| 2008/0225955 | A1 | 9/2008 | Ridge et al. |
| 2009/0150644 | A1 | 6/2009 | Kwon et al. |
| 2012/0143932 | A1 | 6/2012 | Fossom |
| 2015/0067009 | A1 | 3/2015 | Strauss et al. |
| 2016/0358070 | A1 | 12/2016 | Brothers et al. |

(Continued)

FOREIGN PATENT DOCUMENTS

| | | |
|---|---|---|
| CN | 107239825 A | 10/2017 |
| CN | 108205433 A | 6/2018 |
| WO | 2019060670 A1 | 3/2019 |

OTHER PUBLICATIONS

Albericio et al., "Cnvlutin: Ineffectual-Neuron-Free Deep Neural Network Computing," Computer Architecture (ISCA), 2016 ACM/IEEE 43rd Annual International Symposium on Computer Architecture, IEEE, pp. 1-13 (2016).

(Continued)

*Primary Examiner* — Tsu-Chang Lee
(74) *Attorney, Agent, or Firm* — Finnegan, Henderson, Farabow, Garrett & Dunner, LLP

(57) ABSTRACT

The present disclosure relates to systems and methods for providing vector-wise sparsity in neural networks. In some embodiments, an exemplary method for providing vector-wise sparsity in a neural network, comprises: dividing a matrix associated with the neural network into a plurality of vectors; selecting a first subset of non-zero elements from the plurality of vectors to form a pruned matrix; and outputting the pruned matrix for executing the neural network using the pruned matrix.

15 Claims, 18 Drawing Sheets

(56) References Cited

U.S. PATENT DOCUMENTS

| | | | |
|---|---|---|---|
| 2017/0316312 A1 | 11/2017 | Goyal et al. | |
| 2018/0046897 A1 | 2/2018 | Kang et al. | |
| 2018/0046914 A1* | 2/2018 | Li | G06N 3/082 |
| 2018/0046915 A1 | 2/2018 | Sun et al. | |
| 2018/0181867 A1 | 6/2018 | Seibold et al. | |
| 2019/0042542 A1 | 2/2019 | Narayanamoorthy et al. | |
| 2019/0121837 A1* | 4/2019 | Azizi | G06F 9/3001 |
| 2019/0164538 A1 | 5/2019 | Seo et al. | |
| 2019/0180184 A1* | 6/2019 | Deng | G06N 3/04 |
| 2020/0334537 A1* | 10/2020 | Yao | G06N 3/045 |
| 2021/0097443 A1* | 4/2021 | Li | G06N 3/082 |

OTHER PUBLICATIONS

Buluc et al., "Parallel Sparse Matrix-Vector and Matrix-Transpose-Vector Multiplication Using Compressed Sparse Blocks," Proceedings of the twenty-first annual symposium on Parallelism in algorithms and architectures, ACM, pp. 233-244 (2009).

Chellapilla et al., "High Performance Convolutional Neural Networks for Document Processing," Tenth International Workshop on Frontiers in Handwriting Recognition, Suvisoft, 7 pages (2006).

Gray et al., "GPU Kernels for Block-Sparse Weights," Technical Report, OpenAI, 12 pages (2017).

Han et al., "EIE: Efficient Inference Engine on Compressed Deep Neural Network," Proceedings of the 43$^{rd}$ International Symposium on Computer Architecture (ISCA), IEEE Press, pp. 243-254 (2016).

Han et al., "Deep Compression: Compressing Deep Neural Networks with Pruning, Trained Quantization and Huffman Coding," International Conference on Learning Representations (ICLR), pp. 1-14 (2016).

Han et al., "ESE: Efficient Speech Recognition Engine with Sparse LSTM on FPGA," Proccedings of the 2017 ACM/SIGDA International Symposium on Field-Programmable Gate Arrays (FPGA), ACM, pp. 75-84 (2017).

Parashar et al., "SCNN: An Accelerator for Compressed-Sparse Convolutional Neural Networks," 2017 ACM/IEEE 44$^{th}$ Annual International Symposium on Computer Architecture (ISCA), IEEE, pp. 27-40 (2017).

Raihan et al., "Modeling Deep Learning Accelerator Enabled GPUs," arXiv:1811.08309v2 (2018).

Sharma et al., "From High-Level Deep Neural Models to FPGAs," 49$^{th}$ Annual IEEE/ACM International Symposium on Microarchitecure, pp. 1-12 (2016).

Sun et al., "meProp: Sparsified Back Propagation for Accelerated Deep Learning with Reduced Overfitting," International Conference on Machine Learning, pp. 3299-3308 (2017).

Wen et al., "Learning Structured Sparsity in Deep Neural Networks," Advances in Neural Information Processing Systems, pp. 2074-2082 (2016).

PCT International Search Report and Written Opinion mailed Oct. 30, 2020, issued in corresponding International Application No. PCT/CN2020/043279 (19 pgs.).

First Office Action issued in corresponding Chinese Application No. 202080061247.8 on Sep. 2, 2024 (8 pages).

* cited by examiner

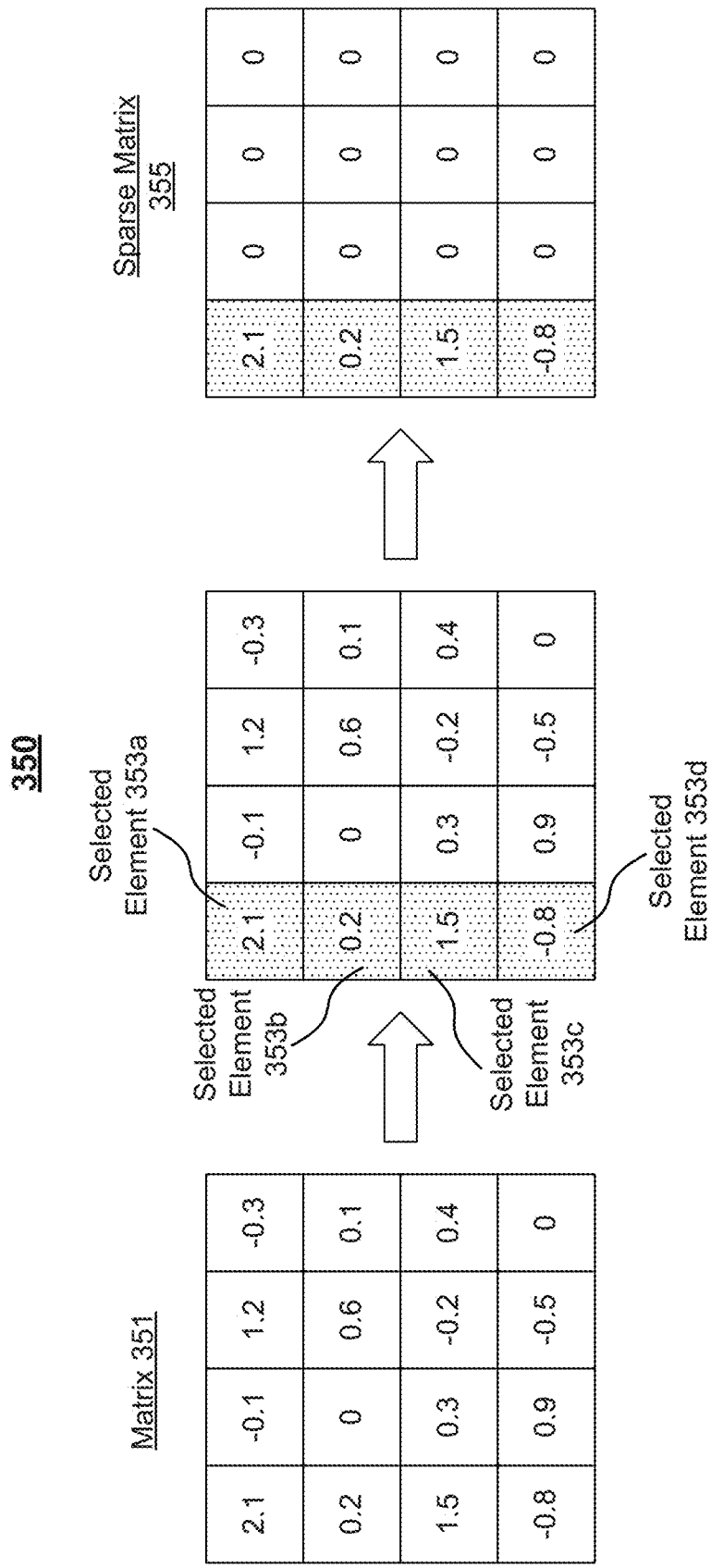

SYSTEMS AND METHODS FOR PROVIDING VECTOR-WISE SPARSITY IN A NEURAL NETWORK

CROSS-REFERENCE TO RELATED APPLICATIONS

The present disclosure claims priority to U.S. Provisional Application No. 62/893,768, filed on Aug. 29, 2019, which is incorporated herein by reference in its entirety.

BACKGROUND

Modern neural networks often include many nodes and many layers. However, this reduces efficiency in execution and increases latency. Accordingly, input sparsity, output sparsity, and weight sparsity have all been proposed, individual or in combination, to increase efficiency and reduce latency. Indeed, sparsity in an artificial neural network more accurately reflects how neurons in a human brain process information.

However, existing techniques generally offer poor overall speedup (e.g., because irregular workload in sparse neural networks is a bottleneck in executing most modern neural networks) or lack accuracy. Hardware, such as central processing units (CPUs) or graphics processing units (GPUs), thus remain inefficient.

SUMMARY

In some embodiments, an exemplary method for providing vector-wise sparsity in a neural network, comprises: dividing a matrix associated with the neural network into a plurality of vectors; selecting a first subset of non-zero elements from the plurality of vectors to form a pruned matrix; and outputting the pruned matrix for executing the neural network using the pruned matrix.

In some embodiments, an exemplary system for providing vector-wise sparsity in a neural network, comprises: at least one memory for storing instructions; and at least one processor to execute the instructions to cause the system to perform: dividing a matrix associated with the neural network into a plurality of vectors; selecting a first subset of non-zero elements from the plurality of vectors to form a pruned matrix; and outputting the pruned matrix for executing the neural network using the pruned matrix.

In some embodiments, a non-transitory computer-readable storage medium may store a set of instructions that is executable by at least one processor to cause the computer to perform a method for providing vector-wise sparsity in a neural network. The method may comprise: dividing a matrix associated with the neural network into a plurality of vectors; selecting a first subset of non-zero elements from the plurality of vectors to form a pruned matrix; and outputting the pruned matrix for executing the neural network using the pruned matrix.

In some embodiments, an exemplary processor for executing a neural network, comprises: a memory for storing associated offsets of elements of compact vectors within original vectors; and at least one core configured to decode offsets of elements of a first plurality of compact vectors and perform a matrix multiplication of a first operand and a second operand based on the decoded offsets, the first operand comprising the first plurality of compact vectors.

Additional feature and advantages of the present disclosure will be set forth in part in the following detailed description, and in part will be obvious from the description, or may be learned by practice of the present disclosure. The feature and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 3B is a schematic representation of unified sparsifying of a matrix.

DETAILED DESCRIPTION

Figure 1:
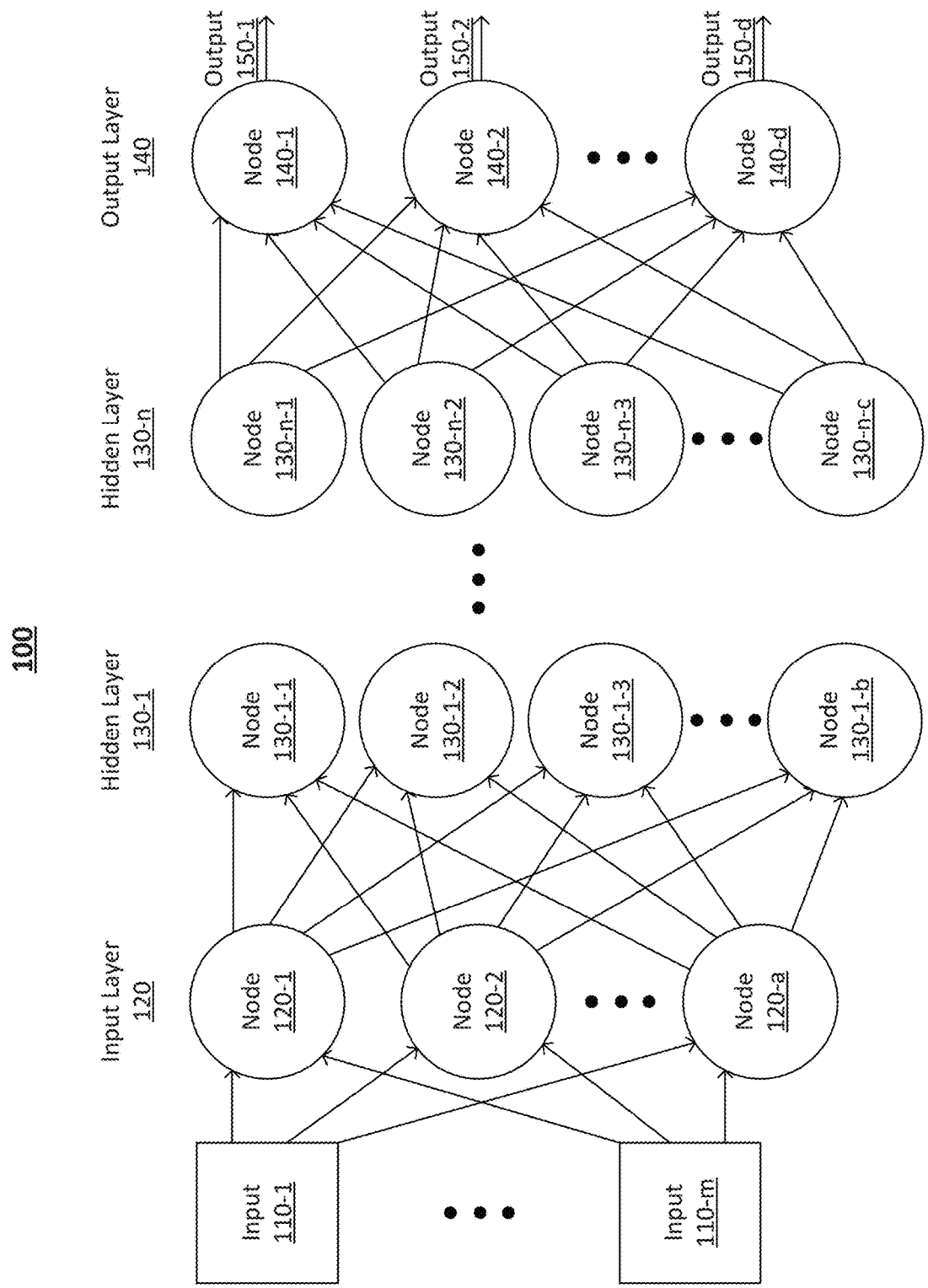
FIG. 1 is a schematic representation of a neural network, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

Existing weight sparsity techniques include generic sparsifying and unified sparsifying. Generic sparsifying zeroes all elements in the weight matrix that are not the four (or any other predetermined number) largest elements in absolute value in the matrix. However, workload in generic sparsified neural networks may be irregular because positions of the non-zero elements are selected from anywhere within the matrix. Unified sparsifying zeroes all elements in the weight matrix not within one or more selected spaces based on L1 (level 1) or L2 (level 2) norm of the selected spaces. Different unified sparsifying techniques have different spatial constraints, e.g., column-wise, row-wise, block-wise, filter-wise, channel-wise, or the like. However, accuracy of an output of unified sparsifying may decrease significantly.

In addition, general matrix multiplication (GEMM) has contiguously advanced, as it is one of the fundamental primitives of many neural networks. Moreover, tensor core has been developed as a hardware accelerator for 16×16 matrix multiplication operations. Unfortunately, because tensor core focuses only on the acceleration of dense matrix multiplication, sparse GEMM cannot take advantage of this hardware accelerator.

Some disclosed embodiments relate to systems and methods for providing vector-wise sparsity in a neural network. In addition, some disclosed embodiments relate to a processor for executing a neural network. Advantageously, the exemplary embodiments can provide improved speed and power efficiency by reducing both mathematical operations and memory transfers required to execute the neural network. Moreover, the disclosed embodiments may be used on any processor, such as central processing units (CPUs) or any other general or specific processing circuitry. Speed may be further increased in some embodiments by implementing the embodiments using a graphics processing units (GPUs).

The apparatus, systems and methods disclosed herein may be used in various neural network-based architectures, such as deep neural networks (DNNs), convolutional neural networks (CNNs), recurrent neural networks (RNNs), or the like, and may be configured for various architectures, such as a CPU, a GPU, a neural network processing unit (NPU), a field programmable gate array (FPGA), a tensor processing unit (TPU), an application-specific integrated circuit (ASIC), or the like.

FIG. 1 is a schematic representation of a neural network (NN) 100. As depicted in FIG. 1, neural network 100 may include an input layer 120 that accepts inputs, e.g., input 110-1, . . . , input 110-$m$. Inputs may include an image, text, or any other structure or unstructured data for processing by neural network 100. In some embodiments, neural network 100 may accept a plurality of inputs simultaneously. For example, in FIG. 1, neural network 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. Any number of inputs can be used in simultaneous input, rapid succession input, or the like.

Input layer 120 may comprise one or more nodes, e.g., node 120-1, node 120-2, . . . , node 120-$a$. Each node may apply an activation function to corresponding input (e.g., one or more of input 110-1, . . . , input 110-$m$) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural network 100 may include one or more hidden layers, e.g., hidden layer 130-1, . . . , hidden layer 130-$n$. Each hidden layer may comprise one or more nodes. For example, in FIG. 1, hidden layer 130-1 comprises node 130-1-1, node 130-1-2, node 130-1-3, . . . , node 130-1-$b$, and hidden layer 130-$n$ comprises node 130-$n$-1, node 130-$n$-2, node 130-$n$-3, . . . , node 130-$n$-$c$. Similar to nodes of input layer 120, nodes of the hidden layers may apply activation functions to output from connected nodes of the previous layer and weight the output from the activation functions by particular weights associated with the nodes.

As further depicted in FIG. 1, neural network 100 may include an output layer 140 that finalizes outputs, e.g., output 150-1, output 150-2, . . . , output 150-$d$. Output layer 140 may comprise one or more nodes, e.g., node 140-1, node 140-2, . . . , node 140-$d$. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, . . . , hidden layer 130-$n$, output layer 140, or the like) may be connected using a convolutional scheme, a sparsely connected scheme, or the like. Such embodiments may use fewer connections between one layer and a previous layer than depicted in FIG. 1.

Moreover, although depicted as a feedforward network in FIG. 1, neural network 100 may additionally or alternatively use backpropagation (e.g., by using long short-term memory nodes or the like). Accordingly, although neural network 100 is depicted similar to a convolutional neural network (CNN), neural network 100 may comprise a recurrent neural network (RNN) or any other neural network.

Figure 2A:
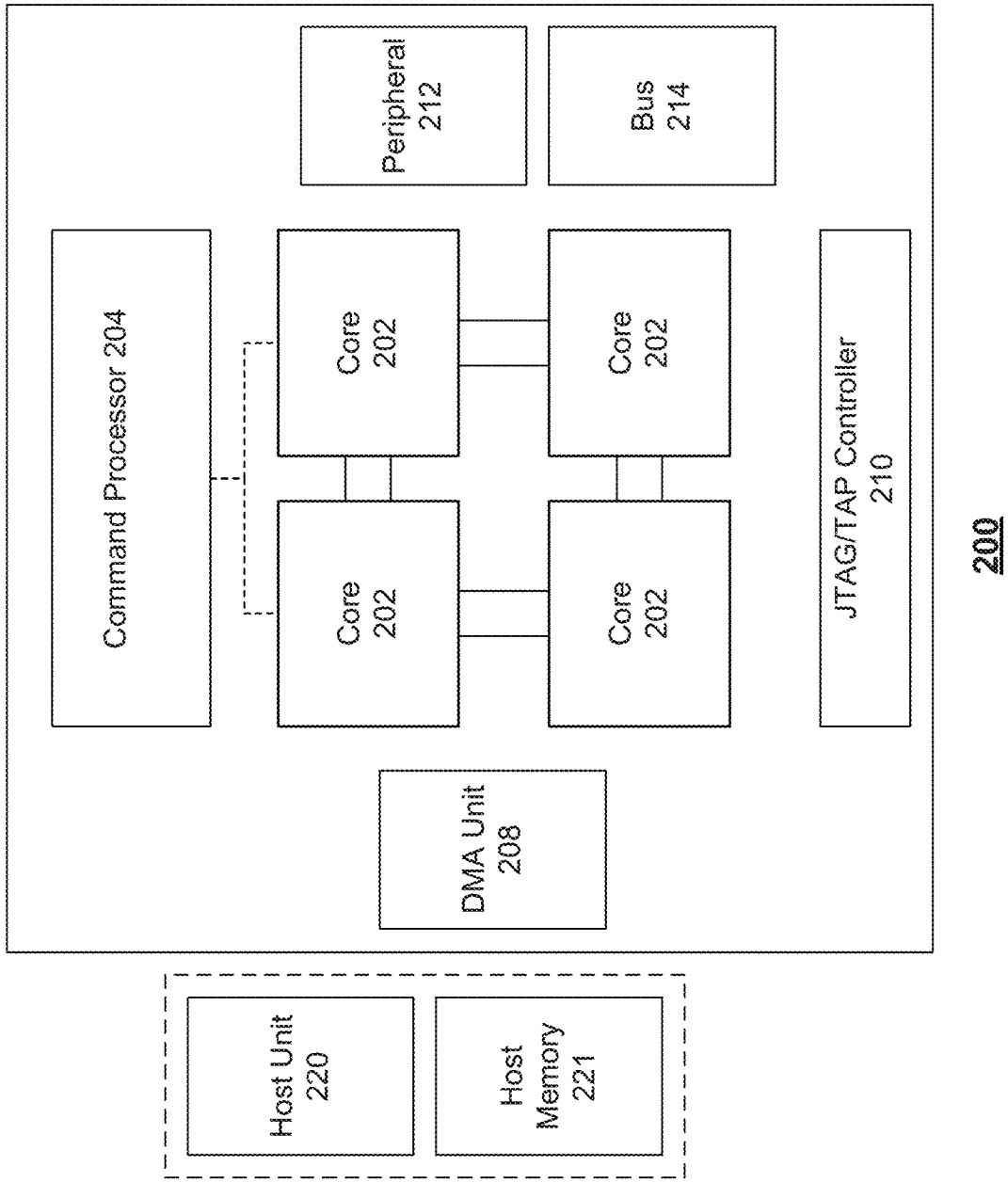
FIG. 2A is a schematic representation of an exemplary neural network accelerator architecture, according to some embodiments of the disclosure.

FIG. 2A illustrates an exemplary neural network accelerator architecture 200, according to some embodiments of the present disclosure. In the context of this disclosure, a neural network accelerator may also be referred to as a machine learning accelerator or deep learning accelerator. In some embodiments, accelerator architecture 200 may be referred to as an NPU architecture 200. As shown in FIG. 1A, accelerator architecture 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that, cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate (MAC), etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models.

Command processor 204 can interact with a host unit 220 and pass pertinent commands and data to corresponding core 202. In some embodiments, command processor 204 can interact with host unit under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator architecture 200 can also communicate with a host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator architecture 200 to be used for executing neural network models.

In some embodiments, a host system having host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 200. As discussed above, these commands can be further processed by command processor 204 of accelerator architecture 200, temporarily stored in an instruction buffer (not shown) of accelerator architecture 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator architecture 200. The loaded instructions may then be distributed to each core (e.g., core 202 of FIG. 2A) assigned with the corresponding task, and the one or more cores may process these instructions.

It is appreciated that the first few instructions received by the cores 202 may instruct the cores 202 to load/store data from host memory 221 into one or more local memories of the cores (e.g., a local memory of the core). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator architecture 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to the another accelerator) or from core 202 (e.g., from a local memory in core 202). It is appreciated that more than one memory controller can be provided in accelerator architecture 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

It is appreciated that accelerator architecture 200 of FIG. 2A can be utilized in various neural networks, such as DNNs (e.g., CNNs, RNNs, or the like). In addition, some embodiments can be configured for various processing architectures, such as NPUs, GPUs, FPGAs, TPUs, ASICs, any other types of heterogeneous accelerator processing units (HAPUs), or the like.

Figure 2B:
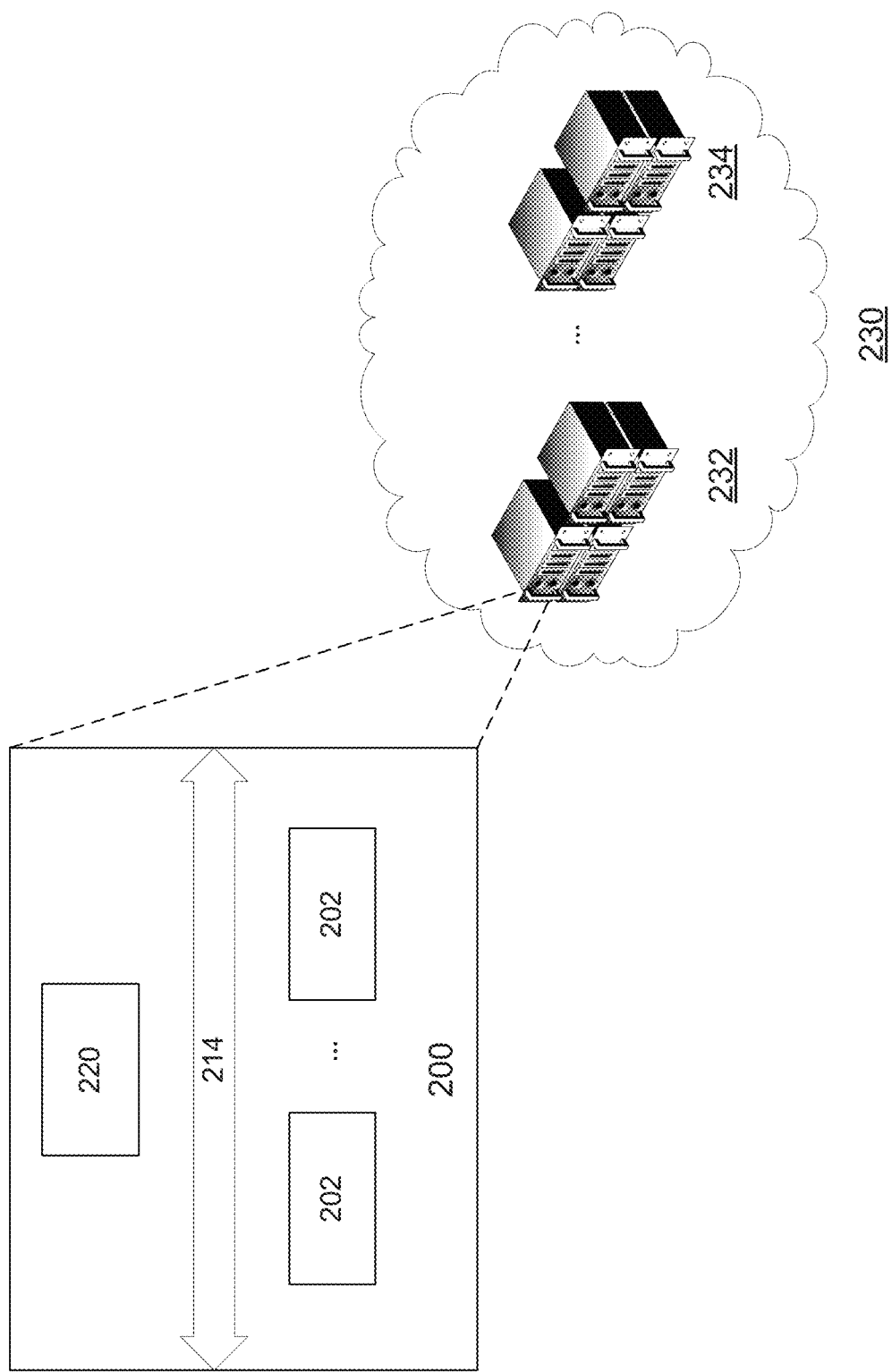
FIG. 2B is a schematic representation of an exemplary cloud system incorporating a neural network accelerator, according to some embodiments of the disclosure.

FIG. 2B illustrates a schematic diagram of an exemplary cloud system incorporating accelerator architecture 200, according to some embodiments of the present disclosure. As shown in FIG. 2B, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 200 of FIG. 2A. Neural network accelerator architecture 200 is shown in FIG. 2B in a simplified manner for simplicity and clarity.

With the assistance of neural network accelerator architecture 200, cloud system 230 can provide the extended AI capabilities of image recognition, facial recognition, translations, 3D modeling, and the like. It is appreciated that, neural network accelerator architecture 200 can be deployed to computing devices in other forms. For example, neural network accelerator architecture 200 can also be integrated in a computing device, such as a smart phone, a tablet, and a wearable device.

Moreover, while a neural network accelerator architecture is shown in FIGS. 2A-2B, it is appreciated that any accelerator that provides the ability to perform parallel computation can be used.

Figure 3A:
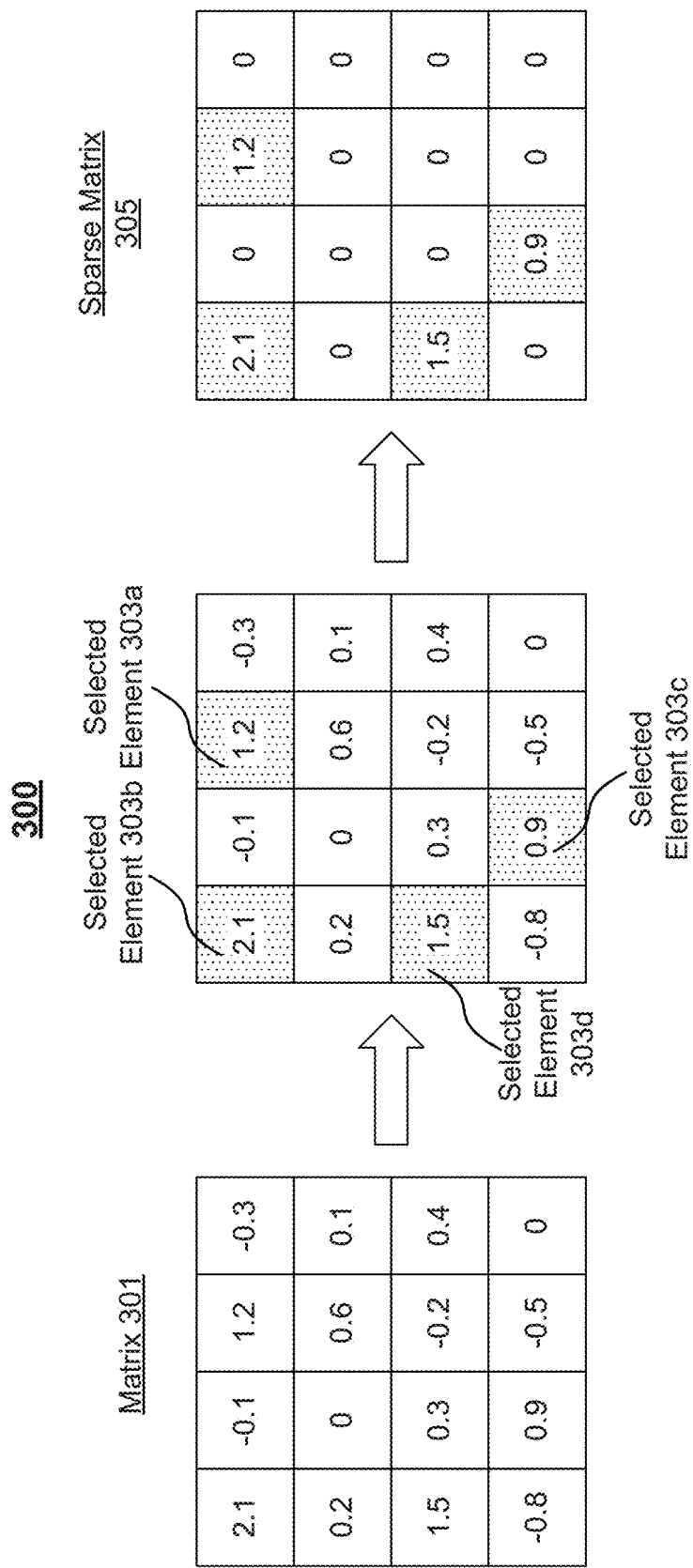
FIG. 3A is a schematic representation of generic sparsifying of a matrix.

FIG. 3A is a representation of a generic sparsifying 300 of a matrix (e.g., a weight matrix) 301 associated with a neural network. For example, generic sparsifying 300 may reduce matrix 301 to a sparse matrix 305 to reduce a number of calculations required for executing the neural network. Although depicted as a 4×4 matrix, matrix 301 may be any size.

Accordingly, as depicted in FIG. 3A, generic sparsifying 300 may include selecting one or more elements, e.g., elements 303a, 303b, 303c, and 303d, from matrix 301. Although depicted as selecting four elements, generic sparsifying 300 may use any predetermined number of elements. Elements 303a, 303b, 303c, and 303d may be selected on account of having the four largest absolute values. Generic sparsifying 300 may further include zeroing out non-selected elements, as shown in sparse matrix 305. Accordingly, as depicted in FIG. 3A, generic sparsifying 300 has enforced 75% sparsity on matrix 301. Moreover, the degree of sparsity may depend on the predetermined number of elements and the size of matrix 301.

FIG. 3B is a representation of a unified sparsifying 350 of a matrix (e.g., a weight matrix) 351 associated with a neural network. For example, unified sparsifying 350 may reduce matrix 351 to a sparse matrix 355 to reduce a number of calculations required for executing the neural network. Although depicted as a 4×4 matrix, matrix 351 may be any size.

Accordingly, as depicted in FIG. 3B, unified sparsifying 350 may include selecting one or more elements, e.g., elements 353a, 353b, 353c, and 353d, from matrix 351. Although depicted as selecting four elements, unified sparsifying 350 may use any predetermined number of elements. Elements 353a, 353b, 353c, and 353d may be selected on account of being within a selected column. Although depicted as selecting one column, unified sparsifying 350 may select any predetermined numbers of spaces, e.g., columns, rows, blocks, filters, channels, or the like. Unified sparsifying 350 may further include zeroing out non-selected elements, as shown in sparse matrix 355. Accordingly, as depicted in FIG. 3B, unified sparsifying 350 has enforced 75% weight sparsity on matrix 351. Moreover, the degree of sparsity may depend on the predetermined number of columns and the size of matrix 351.

Generic sparsifying 300 may, however, fail to provide spatial predictability in selecting elements not to set to zero because the elements with the largest absolute values may be distributed anywhere in matrix 301. Therefore, sparse matrix multiply software/hardware has to deal with randomness in the selected element position of generic sparsified matrix, which leads to huge performance overhead. Accordingly, for large matrices 301, tracking multiplication of corresponding sparse inputs with reduced matrix 301 may require significant memory. Unified sparsifying 350 may, however, fail to provide acceptable accuracy levels in the neural network. Some embodiments of the present disclosure may achieve speedups like unified sparsifying 350 without similar losses in accuracy. For example, some embodiments of the present disclosure may divide matrices into vectors (as depicted in FIG. 4) and enforce sparsity on each vector (as depicted in FIG. 5).

Figure 4:
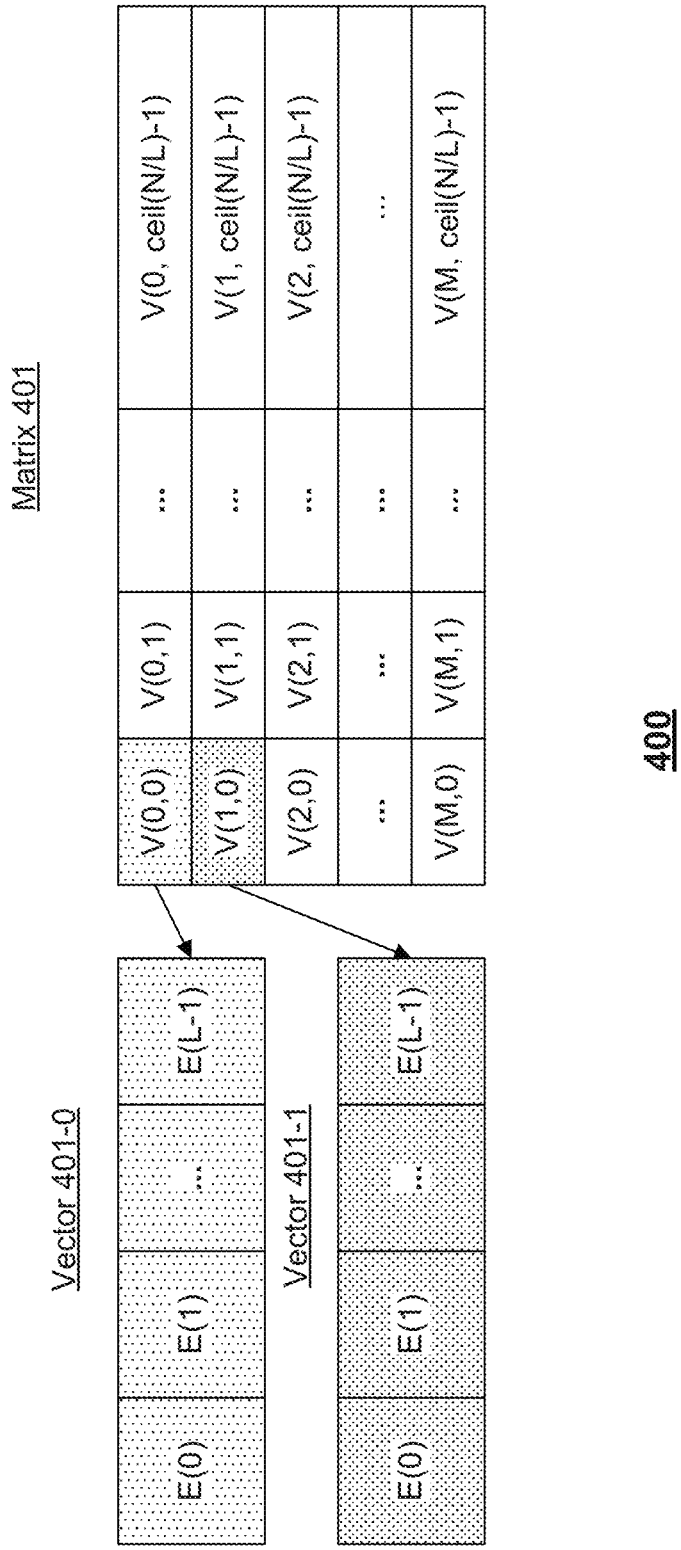
FIG. 4 a schematic representation of a vector-wise division of a matrix, according to some embodiments of the present disclosure.

FIG. 4 is a schematic representation of a vector-wise division 400 of a matrix 401, according to some embodiments of the present disclosure. Matrix 401 can be associated with a neural network. For example, matrix 401 can be a weight matrix, an input matrix, an output matrix, or the like. For example, vector-wise division 400 may divide matrix 401 into vectors of size L ("L-dimensional vectors"). Matrix 401 is depicted as an M×N matrix. In some embodiments, if the M×N matrix does not divide evenly into L-dimensional vectors, division 400 may include padding one or more residual vectors with zeroes such that each vector is the same size.

As further shown in FIG. 4, by dividing matrix 401 into vectors (e.g., 401-0, 401-1, and the like), each vector may be identified by coordinates relative to the matrix 401 (e.g., V(0,0), V(0,1), V(1,0), and the like), and each element within a vector may be identified by an offset relative to the vector (e.g., E(0), E(1), . . . , E(L−1)).

Figure 5:
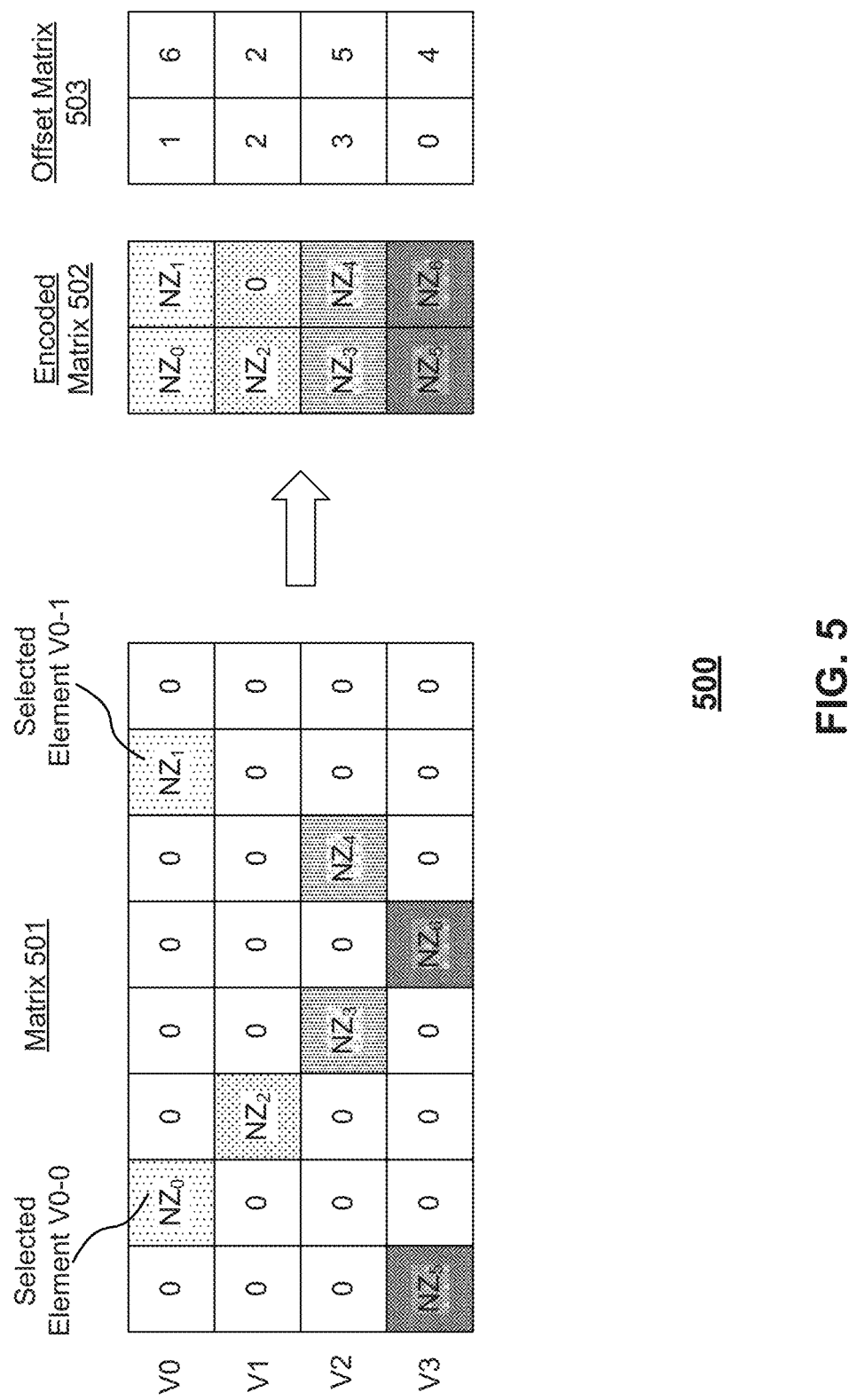
FIG. 5 is a schematic representation of an exemplary encoding of a matrix, according to some embodiments of the present disclosure.

FIG. 5 is a schematic representation of an exemplary encoding 500 of a matrix 501, according to some embodiments of the present disclosure. Matrix 501 can be associated with a neural network. For example, matrix 501 can be a weight matrix, an input matrix, an output matrix, or the like. As shown in FIG. 5, matrix 501 may be divided into four vectors (e.g., V0, V1, V2, and V3) of size 8. For each of four vectors V0, V1, V2, and V3, at most two (or any predetermined number) non-zero elements may be selected and encoded into one compact vector in encoded matrix 502 associated with their offsets in offset matrix 503. All vectors V0, V1, V2, and V3 may be encoded to a same length K (e.g., K=2 in FIG. 5). If a vector (e.g., V1) has less non-zero elements than compact vector length K, the corresponding compact vector may be padded with zeros. Although depicted as using a 4×8 matrix 501, 8-dimensional vectors V0, V1, V2, and V3 (e.g., L=8), and 2-dimensional compact vectors (e.g., K=2), matrix 501, vectors V0, V1, V2, and V3 and the corresponding compact vectors may be of any size.

In some embodiments, encoding of an M×N matrix may include dividing the M×N matrix into L-dimensional vectors. Thus, M×N matrix may have M×⌈N/L⌋ vectors. If the M×N matrix does not divide evenly into L-dimensional vectors, encoding may include padding one or more residual vectors with zeroes such that each vector is the same size. Encoding may also include selecting a predetermined number K (K≤L) of non-zero elements in each vector and encoding the selected non-zero elements to corresponding K-dimensional compact vector with associated offsets in original vector. If a vector has less non-zero elements than K, empty elements in corresponding K-dimensional compact vector can be padded with zeros. Encoding may also include counting the number of non-zero elements $N_{NZ}$ in each vector and setting K to a maximum $N_{NZ}$ of all vectors in matrix. In such embodiments, all non-zero elements in matrix may be encoded into compact vectors.

It is appreciated that, although embodiments shown in FIGS. 4-5 and many other embodiments in present disclosure use row vectors, the vector-wise division and encoding described herein may either be performed column-wise or row-wise.

Theoretically, $\log_2 L$ bits may be required to encode each offset index in a L-dimensional vector. Therefore, overall compression ratio of the encoding is $$\frac{P \times L}{(P + \lceil \log_2 L \rceil) \times K}$$

where P represents the number of bits used to store the value of an element. For example, in the exemplary embodiment of encoding for a 4×8 16-bit floating point (FP16) matrix 501 shown in FIG. 5, where L=8, K=2, each element of the offset matrix 503 can be represented in 3 bits because the offset is in the range [0, 7]. Therefore, the compression ratio is 3.37. If K is set to the maximum number of non-zero elements in a vector, the encoding may achieve an enhanced compression ratio when all vectors have the same number of non-zero elements.

Figure 6A:
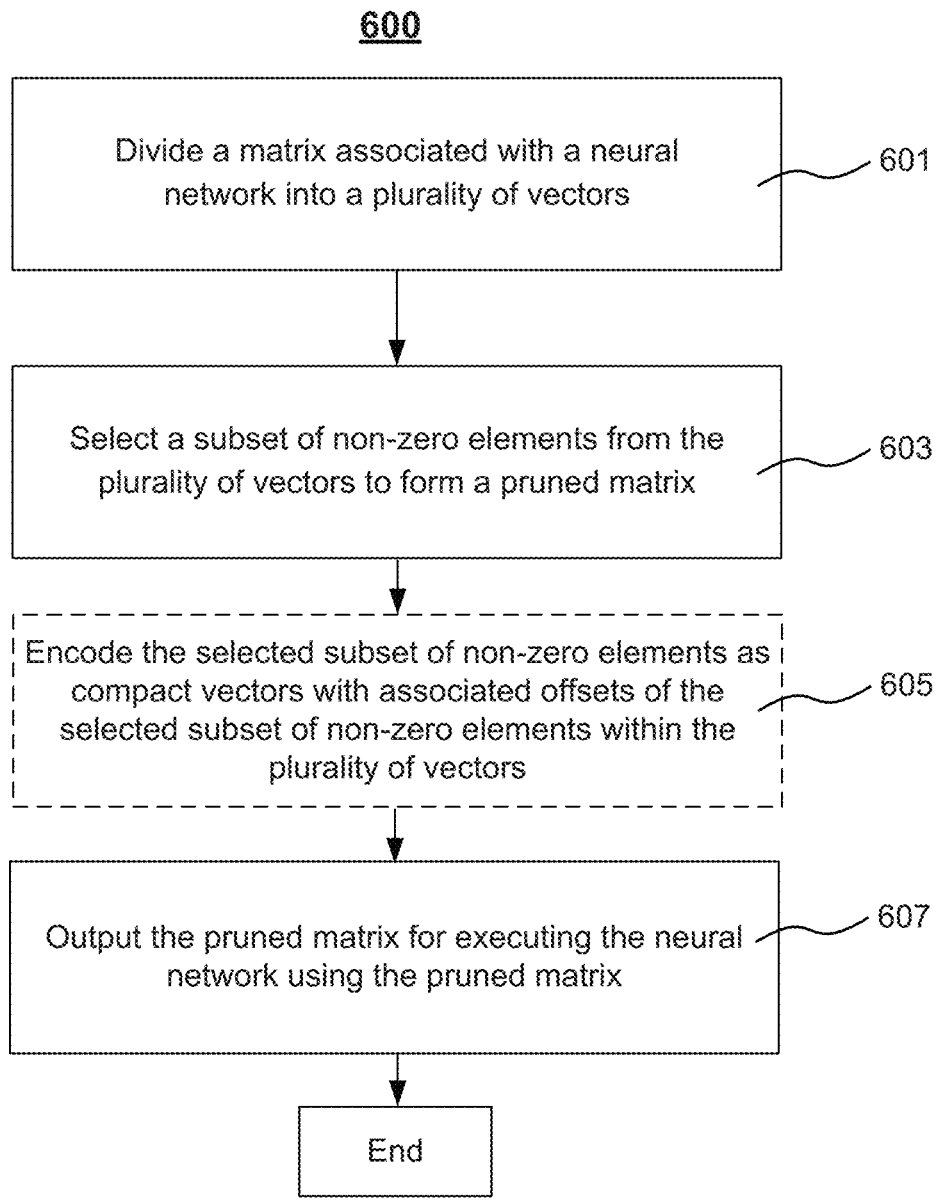
FIG. 6A is a flowchart of an exemplary method for providing vector-wise sparsity in a neural network, according to some embodiments of the present disclosure.
Figure 6B:
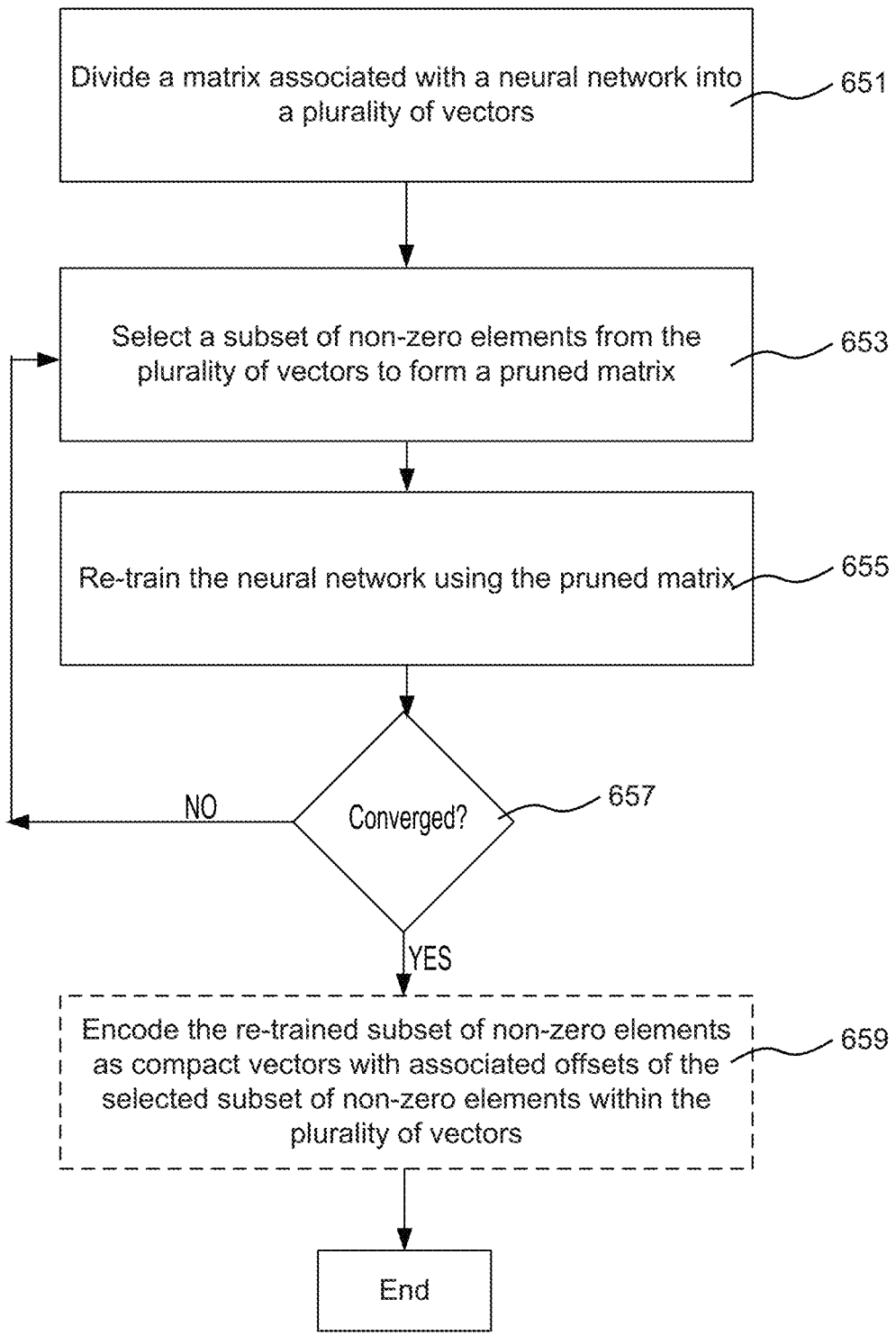
FIG. 6B is a flowchart of another exemplary method for providing vector-wise sparsity in a neural network, according to some embodiments of the present disclosure.

FIGS. 6A-6B illustrate flowcharts of an exemplary methods 600 and 650, respectively, for providing vector-wise sparsity in a neural network, according to some embodiments of the present disclosure. The exemplary methods 600 and 650 may be performed by at least one processor (e.g., accelerator architecture 200 or host unit 220 of FIGS. 2A-2B, processor 800 of FIG. 8, processor 1100 of FIG. 11, or the like). Moreover, methods 600 and 650 can also be implemented by a computer program product, embodied in a computer-readable medium, including computer-executable instructions, such as program code, executed by computers, such as the systems or architectures as shown in FIGS. 2A-2B, FIG. 8, and FIG. 11.

As shown in FIG. 6A, at step 601, the at least one processor may divide a matrix associated with a neural network into a plurality of vectors. The matrix can be a weight matrix, an input matrix, an output matrix, or the like. For example, as explained with reference to FIG. 4, the at least one processor may divide an M×N matrix into a plurality of L-dimensional vectors. In some embodiments, if the M×N matrix does not divide evenly into L-dimensional vectors, method 600 may include padding one or more residual vectors with zeroes such that each vector is the same size L. It is appreciated that the dividing of step 601 can be either column-wise or row-wise.

At step 603, the at least one processor may select a subset of non-zero elements from the plurality of vectors to form a pruned matrix. For example, for each L-dimensional vector, the at least one processor may select K non-zero elements. K is a predetermined number and less than or equal to L. In some embodiments, K can be set to a maximum of non-zero element numbers of all vectors in the matrix. Therefore, all non-zero elements in the matrix are selected to form a pruned matrix. Alternatively, less than all non-zero elements in matrix may be selected according to a predetermined standard. For example, the largest K non-zero elements in absolute value may be selected to form the pruned matrix. In some embodiments, selecting may include zeroing non-zero elements not selected in each vector of the plurality of vectors to form a pruned matrix.

Optionally, at step 605, the at least one processor may encode the selected subset of non-zero elements as compact vectors with associated offsets of the selected subset of non-zero elements within the plurality of vectors. If a vector has less non-zero elements than a length of the compact vector, the corresponding compact vector can be padded with zeros.

Method 600 may further include additional steps. For example, at step 607, the at least one processor may output the pruned matrix for executing the neural network using the pruned matrix. The at least one processor may perform execution of the neural network with the compact vectors and associated offsets (not shown in FIG. 6A). For example, the at least one processor may fetch the offsets, and perform a matrix multiplication of the compact vectors and a matrix by multiplying elements in the compact vectors associated with the fetched offsets and elements in the matrix corresponding with the fetched offsets. Additionally or alternatively, the at least one processor may re-train the neural network using the pruned matrix (not shown in FIG. 6A). The re-training may include at least one of modifying one or more elements of the pruned matrix or modifying one or more activation functions of one or more nodes of the neural network.

FIG. 6B illustrates a flowchart of another exemplary method 650 for providing vector-wise sparsity in a neural network, according to some embodiments of the present disclosure. As shown in FIG. 6B, at step 651, the at least one processor may divide a matrix associated with a neural network into a plurality of vectors. In some embodiments, the matrix can be a weight matrix. For example, as explained with reference to FIG. 4, an M×N matrix may be divided to a plurality of L-dimensional vectors. In some embodiments, if the M×N matrix does not divide evenly into L-dimensional vectors, method 650 may include padding one or more residual vectors with zeroes such that each vector is the same size L. It is appreciated that the dividing may be column-wise or row-wise.

At step 653, the at least one processor may select a subset of non-zero elements from one or more of the plurality of vectors to form a pruned matrix. For example, for each L-dimensional vector, the at least one processor may select K non-zero elements. K is a predetermined number and less than or equal to L. In some embodiments, K can be set to a maximum of non-zero element numbers of all vectors in the matrix. Therefore, all non-zero elements in matrix are selected to form a pruned matrix. Alternatively, less than all non-zero elements in matrix may be selected according to a predetermined standard. For example, the largest K non-zero elements in absolute value may be selected to form the pruned matrix. In some embodiments, selecting may include zeroing non-zero elements not selected in each vector of the plurality of vectors to form a pruned matrix.

At step 655, the at least one processor may re-train the neural network using the pruned matrix. For example, the matrix is weight matrix, and re-training may include applying a test data set or a training data set to the neural network using the pruned weight matrix obtained via steps 651, 653, and modifying the neural network accordingly to reduce one or more associated loss functions calculated after applying the test data set or the training data set. In some embodiments, the re-training may include modifying one or more elements of the weight matrix or modifying one or more activation functions of one or more nodes of the neural network.

At step 657, the at least one processor may determine whether the re-trained neural network has converged. For example, convergence may occur if a desired sparsity level has been reached, if an accuracy of the neural network has dropped below a threshold, or if any other value associated with the neural network has reached or crossed a predetermined threshold. If converged, method 650 may end; if not, method 650 may iterate, as depicted in FIG. 6B.

Some embodiments of present application may provide a flexibility to specify a condition for convergence (e.g., the acceptable error rate), which usually varies in different applications. For example, if an application is more sensitive to latency rather than accuracy, the maximum accuracy drop can be set higher to gain more sparsity. Alternatively, the maximum accuracy drop can be set small enough to ensure accuracy.

Although described above with respect to one iteration, method 650 may further iteratively selecting, at step 653, a second subset of non-zero elements from one or more of the plurality of vectors to form a second pruned matrix, and re-training, at step 655, the neural network using the second pruned matrix. In some embodiments, selecting a second subset of non-zero elements may include decreasing the predetermined number used in the first iteration, and selecting the decreased predetermined number of largest non-zero elements from each vector of the plurality of vectors.

This iteration may end after a desired sparsity level has been reached or after an accuracy of the neural network has dropped below a threshold. In such embodiments, the neural network obtained on the final iteration (or, in embodiments where the accuracy has dropped below the threshold, obtained on the penultimate iteration) may be executed or stored or otherwise finalized. Accordingly, as described with respect to step 657, the iteration can be halted if an accuracy of the re-trained neural network is below a threshold.

Optionally, at step 659, the at least one processor may encode the re-trained subset of non-zero elements as compact vectors with associated offsets of the selected subset of non-zero elements within the plurality of vectors. If a vector has less non-zero elements than a length of the compact vector, the corresponding compact vector can be padded with zeros.

Method 650 may further include additional steps. For example, the at least one processor may output the re-trained pruned matrix or the compact vectors with associated offsets (if there is a step of encoding) for executing the neural network using the pruned matrix (not shown in FIG. 6B). Additionally or alternatively, the at least one processor may perform execution of the neural network with the compact vectors and associated offsets (not shown in FIG. 6B). For example, the at least one processor may fetch the offsets, and perform a matrix multiplication of the compact vectors and a matrix by multiplying elements in the compact vectors associated with the fetched offsets and elements in the matrix corresponding with the fetched offsets.

Figure 7:
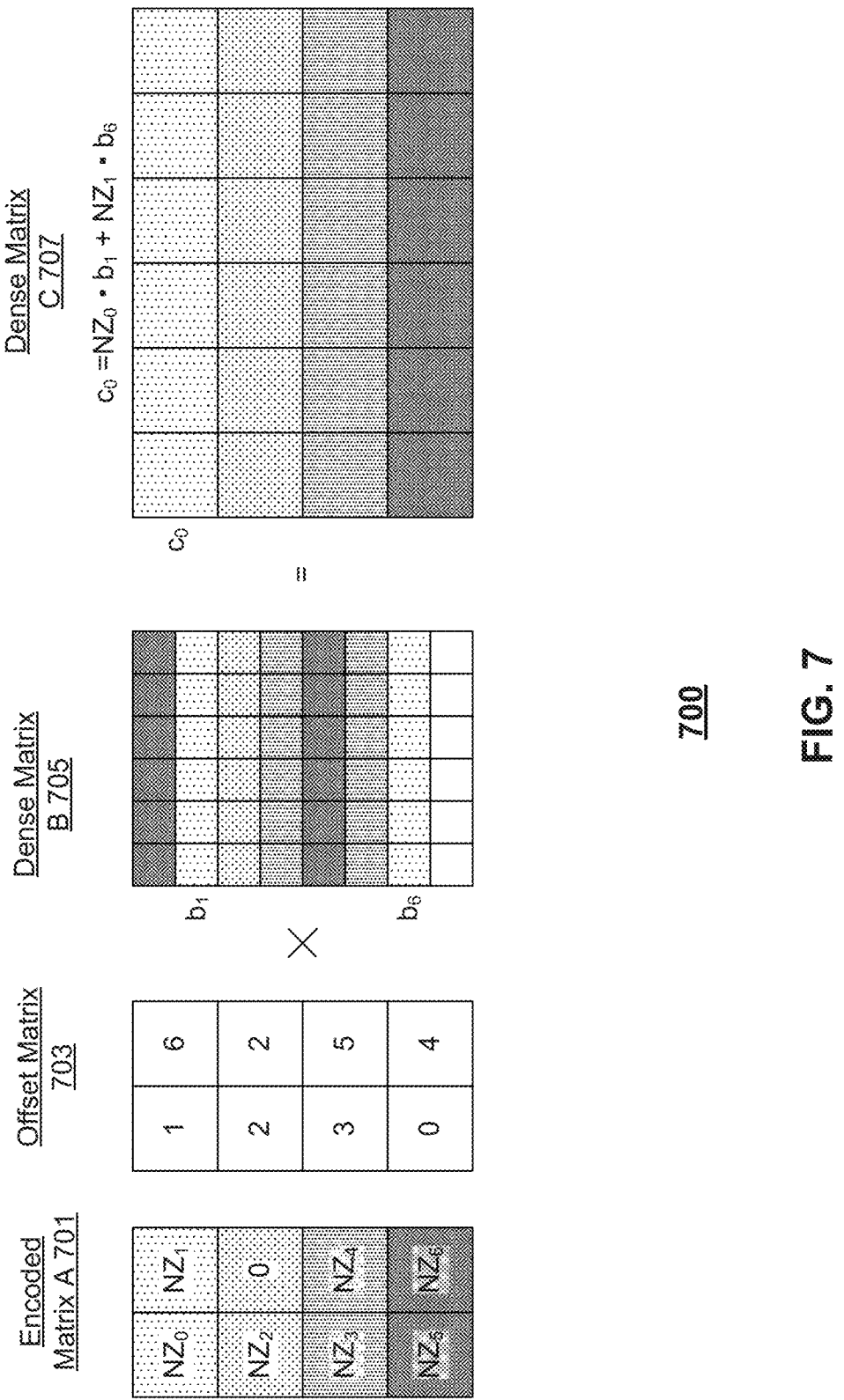
FIG. 7 is a schematic representation of an exemplary vector-wise matrix multiplication, according to some embodiments of the present disclosure.

FIG. 7 is a schematic representation of an exemplary vector-wise matrix multiplication 700, according to some embodiments of the present disclosure. In some embodiments, matrix multiplication 700 may be combined with encoding 500 of FIG. 5, method 600 of FIG. 6A or method 650 of FIG. 6B. For example, matrix multiplication 700 may utilize encoded matrix produced by encoding 500 of FIG. 5, method 600 of FIG. 6A or method 650 of FIG. 6B.

Matrix multiplication 700 may include three matrix, matrix A, dense matrix B and dense matrix C, where C=A×B. The sizes of matrices A, B, and C may be 4×8, 8×6, and 4×6, respectively. In traditional dense matrix multiplication, the product of every row of matrix A and every column of matrix B needs to be computed, regardless of sparsity. Therefore, each row of matrix C needs 48(=8×6) multiplications. As shown in FIG. 7, after pruned and encoded according to some embodiments of present application, the 4×8 matrix A becomes a 4×2 encoded matrix A 701 with an associated offset matrix 703 of the same size. Therefore, matrix multiplication 700 may only need a subset of the elements of matrix B 705 to compute the product matrix C 707. For example, since the first row of encoded matrix A 701 has non-zero elements at offsets 1 and 6 (e.g., column 1 and 6), the computation of first row co in matrix C is equivalent to $NZ_0 \cdot b_1 + NZ_1 \cdot b_6$, where $b_1$ and $b_6$ represent corresponding rows 1 and 6 in matrix B. As a result, in the example of FIG. 7, only 12(=2×6) multiplications are executed, resulting in a 75% multiplication reduction. It will be appreciated that any level of multiplication reduction may be achieved using the vector-sparsity techniques described herein.

Figure 8:
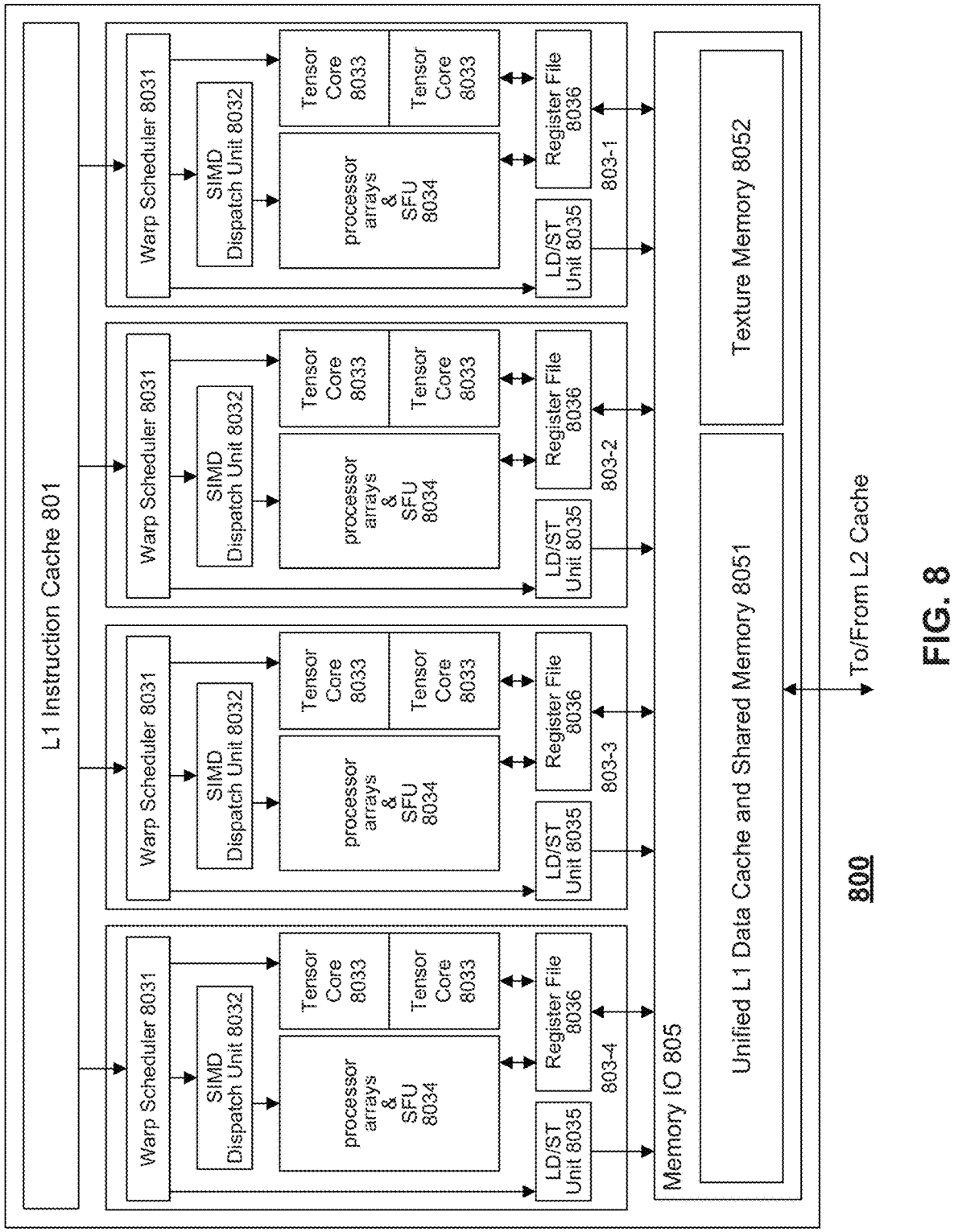
FIG. 8 is a schematic representation of an exemplary processor, according to some embodiments of the present disclosure.

FIG. 8 is a schematic representation of an exemplary processor 800, according to some embodiments of the present disclosure. Processor 800 can perform division 400 of FIG. 4, encoding 500 of FIG. 5, method 600 of FIG. 6A, method 650 of FIG. 6B, matrix multiplication 700 of FIG. 7, or other embodiments of present disclosure. Processor 800 can be or be a part of CPU (e.g., host unit 220 of FIGS. 2A-2B), GPU, NPU (e.g., accelerator architecture 200 of FIGS. 2A-2B), TPU, FPGA, ASIC, or the like.

As shown in FIG. 8, processor 800 can includes a L1 instruction cache 801, one or more subcores 803, and a memory IO 805. Although four subcores 803-1, 803-2, 803-3 and 803-4 are shown in FIG. 8, any number of subcores 803 can be included in processor 800. In some embodiments, a subcore can include a warp scheduler 8031, a Single Instruction Multiple Data (SIMD) dispatch unit 8032, one or more tensor cores 8033, processor arrays for multiple data types (e.g., Compute Unified Device Architecture (CUDA) Cores) and special function units (SFUs) 8034, Load/Store Units (LD/ST) unit 8035, and register file 8036. Tensor core 8033 can provide multiple execution modes, Floating Point 16 (FP16) mode, mixed precision mode, FP32 mode, and FP64 mode. In the FP16/FP32/FP64 mode, all matrices are in FP16/FP32/FP64. In the mixed precision mode, tensor core 8033 uses Floating Point 32 (FP32) accumulators and writes back the results to an FP32 matrix. During computation, tensor cores 8033 in a subcore 803 (e.g., two tensor cores) can be used concurrently by a warp.

Memory IO 805 can include a unified Level 1 (L1) data cache and shared memory 8051 and a texture memory 8052. The L1 data cache and shared memory 8051 may be shared among the subcores 803.

Warp Matrix Multiply and Accumulate (WMMA) may compute a matrix multiply and accumulate of three matrices A, B and C, and obtain a matrix D, where D=A×B+C. To execute a WMMA, a plurality of threads in a warp are divided into thread groups. In addition, for better data reuse, a number of thread groups can work together as a work tuple. For example, given A, B, C, and D are 16×16 matrices, to execute a WMMA, 32 threads in a warp are divided into 8 thread groups. All threads in a thread group work together to compute 4×4×4 tile multiplications. Two thread groups work together as a work tuple. Work tuple i includes thread group i and thread group i+4.

Figure 9:
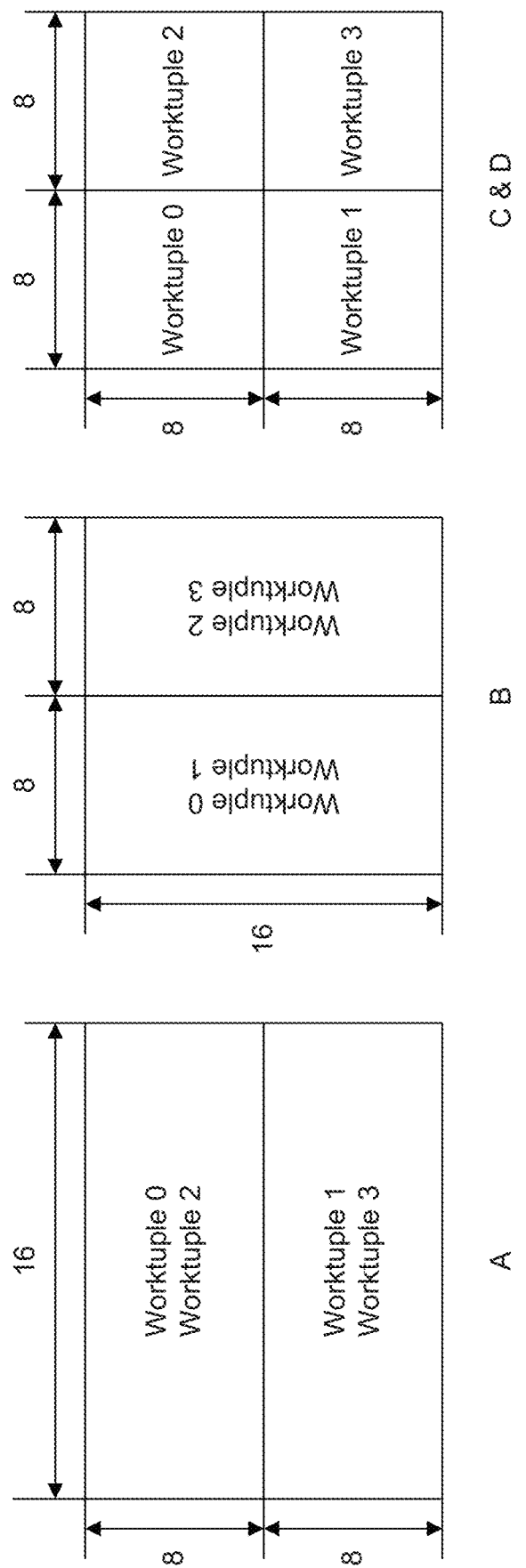
FIG. 9 is a schematic representation of mapping a matrix multiplication into work tuples in a warp, according to some embodiments of the present disclosure.

FIG. 9 illustrates a schematic representation of mapping a matrix multiplication into work tuples in a warp, according to some embodiments of the present disclosure. In some embodiments, the mapping may be implemented or utilized by accelerator architecture 200 of FIGS. 2A-2B, processor 800 of FIG. 8, or processor 1100 of FIG. 11. Although matrices A, B, C, and D are shown as 16×16 matrices in FIG. 9, it is appreciated that these matrices can be of other sizes.

Specifically, FIG. 9 depicts elements processed by each work tuple in one WMMA operation. Matrix A may relate to four work tuples 0-3 in row-wise, and matrix B may relate to four work tuples 0-3 in column-wise. Matrices C and D may be mapped evenly to four work tuples 0-3 in tile-wise. Therefore, computation task for product matrix D is evenly partitioned into four work tuples. Each work tuple may be responsible for computing one 8×8 tile of D. For example, work tuple 0 computes D[0:7, 0:7]. To achieve this, work tuple 0 may multiply A[0:7, 0:15] and B[0:15, 0:7], add the product 8×8 tile with C[0:7, 0:7], and save the result to D[0:7, 0:7].

Figure 10:
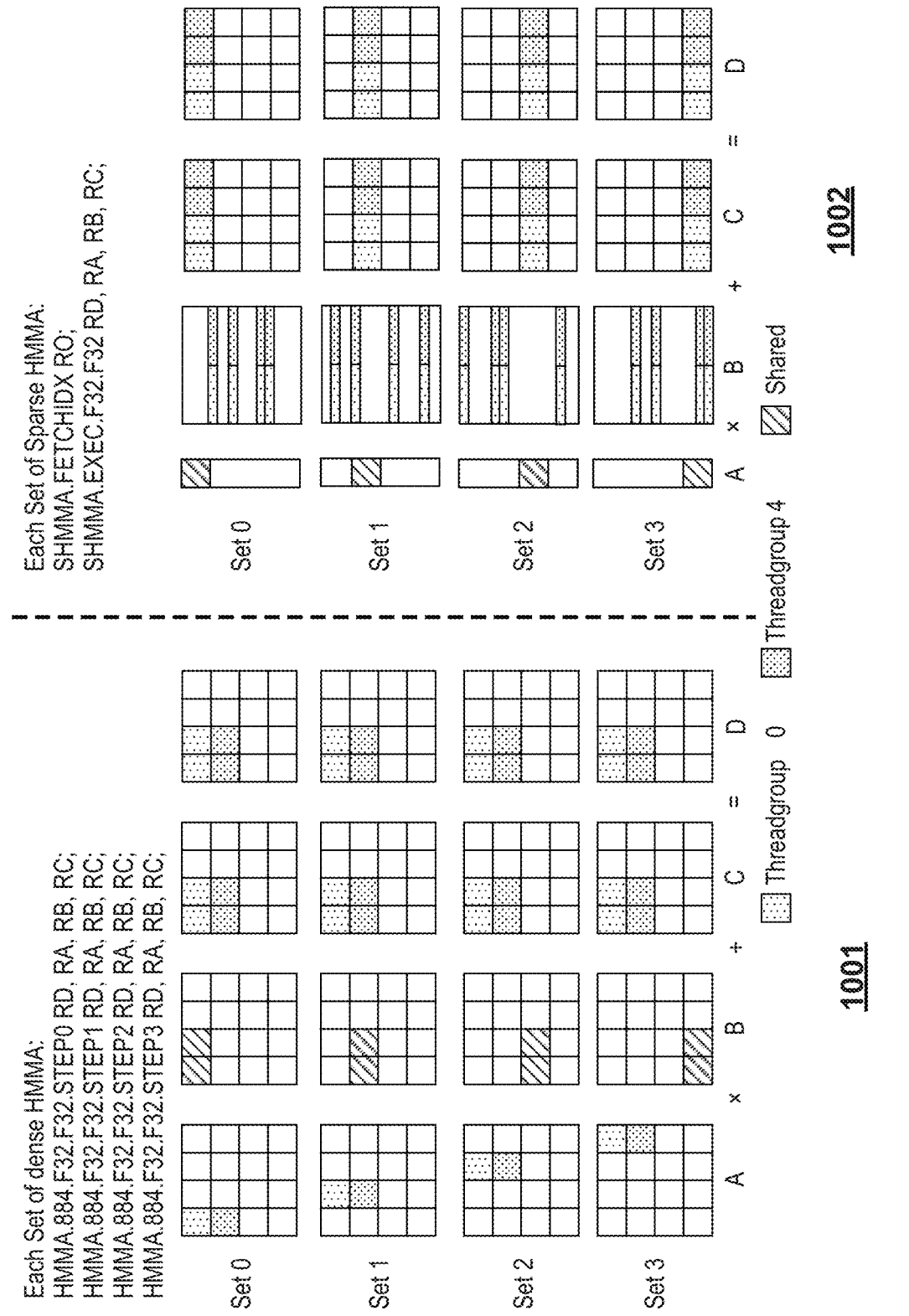
FIG. 10 is a schematic representation of an exemplary processing of elements by the thread groups in an existing dense mode and a vector-wise sparse mode, according to some embodiments of the present disclosure.

FIG. 10 illustrates a schematic representation of an exemplary processing of elements by the thread groups in an existing dense mode 1001 (left) and a vector-wise sparse mode 1002 (right), according to some embodiments of the present disclosure. In dense mode 1001, during compilation time, a WMMA operation may break down into four sets of machine-level HMMA (half-precision matrix multiply-accumulate) instructions. With two thread groups, a work tuple may compute an 8×8×4 matrix multiplication in a set of HMMA instructions. A set of the HMMA instructions for the mixed precision mode may include four HMMA instructions (as shown in 1001 of FIG. 10 (left)).

In vector-wise sparse mode 1002, instead of four HMMA instructions in one set in the dense mode 1001, a set of Sparse HMMA (SHMMA) instructions may include:

SHMMA.FETCHIDX RO;
SHMMA.EXEC.F32.F32 RD, RA, RB, RC.

The instruction SHMMA.FETCHIDX may fetch offset indices of elements in a row of matrix A from RO to an offset register. The instruction SHMMA.EXEC.F32.F32 may decode the offset register to determine which rows of matrix B to fetch from RB, and compute multiplication of matrix A and matrix B and accumulates the results with matrix C. It is appreciated that, although depicted with SHMMA instructions, any appropriate matrix multiply-accumulate instructions on any hardware accelerator may be used to implement the exemplary processing described herein.

For a sparse WMMA (SWMMA) operation, there may be a plurality of sets of SHMMA instructions. As shown in right part of FIG. 10, an SWMMA operation may include four sets of SHMMA instructions, Set 0, Set 1, Set 2 and Set 3. Each thread group computes 8 columns of matrix B by a set of SHMMA instructions. Different from the dense mode 1001, in vector-wise spare mode 1002, two thread groups may compute the same row of matrix A. Row i of D may be computed by multiplying four non-zero elements in row i of matrix A with corresponding four rows of matrix B, respectively, and then accumulating the results with row i of C. The four rows of matrix B to be multiplied may be determined by four offset indices saved in the offset register.

Figure 11:
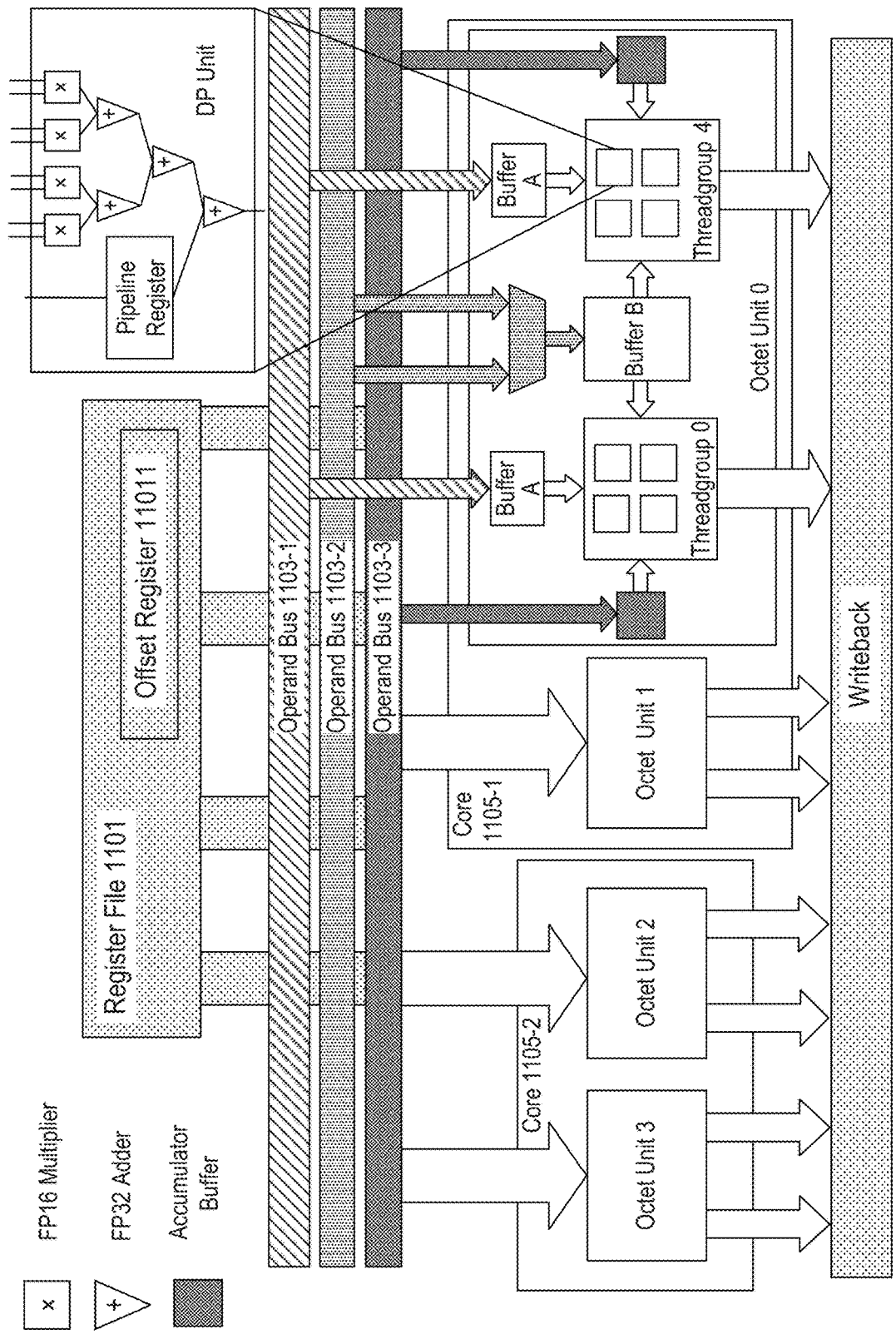
FIG. 11 is a schematic representation of an exemplary processor architecture, according to some embodiments of the present disclosure.

FIG. 11 illustrates a schematic architecture of an exemplary processor 1100, according to some embodiments of the present disclosure. FIG. 11 only shows a part of processor 1100, which may be, in some embodiments, applied to subcore 803 of FIG. 8. As shown in FIG. 11, processor 1100 may include a memory (e.g., a register file 1101), a plurality of operand buses 1103 (e.g., operand bus 1103-1, operand bus 1103-2, and operand bus 1103-3), and a least one core 1105 (e.g., core 1105-1 and core 1105-2). The memory can include a register file 1101 that can include an offset register 11011. In some embodiments, offset register 11011 can be a dedicated offset register and implicitly accessed by SHMMA instructions.

Core 1105 (e.g., tensor core) can decode offsets (e.g., decoding offset register 11011) stored in the memory and perform a matrix multiplication of a first operand from a first operand bus (e.g., operand bus 1103-1) and a second operand from a second operand bus (e.g., operand bus 1103-2). In some embodiments, first operand may be a matrix A which may be encoded by any of methods in present disclosure (e.g., encoding 500 of FIG. 5, method 600 of FIG. 6A, or method 650 of FIG. 6B) and include a plurality of compact vectors with corresponding offsets of its elements within original vectors stored in the memory (e.g., in offset register 11011). Second operand may be another matrix B. Decoding the offsets may include determining which rows or columns of matrix B to fetch. Thus, core 1105 can perform multiplication of the plurality of compact vectors of encoded matrix A with corresponding fetched rows or columns of matrix B, as explained with reference to FIG. 7. In addition, core 1105 can accumulate a result of the matrix multiplication of matrices A and B with a third operand (e.g., matrix C) from a third operand bus (e.g., operand bus 1103-3).

In some embodiments, core 1105 can include one or more groups of processing units. Each group of processing units is corresponding to a thread group. For example, as shown in FIG. 11, core 1105-1 may include two octet units 0-1. Octet unit 0 includes two groups of four Dot Product (DP) units, one group corresponding to thread group 0 and the other group corresponding to thread group 4.

Core 1105 can also include a plurality of buffers. As shown in FIG. 11, buffer A can be connected to operand bus 1103-1 and a group of processing units (e.g., DP units) corresponding to thread group 0 or thread group 4. Buffer B can be connected to operand bus 1103-2 and at least one group of processing units, e.g., two groups of processing units corresponding to thread group 0 and thread group 4. In some embodiment, Buffer B can be a ping-pong buffer which includes a first part for storing data to be read by a processing unit and a second part for loading data from the memory (e.g., register file 11011). Core 1105 can further include a multiplexer connected between operand bus 1103-2 and buffer B. In addition, core 1105 may also include a third buffer (e.g., accumulator buffer) connected to operand bus 1103-3 and a group of processing units, e.g., a group of DP units corresponding to thread group 0 or thread group 4. Therefore, core 1105 can accumulate a result of the matrix multiplication of the first operand from operand bus 1103-1 and the second operand from operand bus 1103-2 with a third operand from operand bus 1103-3. After computation, core 1105 can writeback a result of the computation.

In some embodiments, a SWMMA operation can be implemented by processor 1100 of FIG. 11. Each core 1105 includes two octet units. In an octet unit (e.g., octet unit 0, octet unit 1, octet unit 2, or octet unit 3), there are eight DP units, each of which can compute a 4-dimensional vector dot product per cycle. During execution, a work tuple may be mapped to one octet unit and thus each thread group takes four DP units, respectively. The octet unit may have operand buffers to feed the work tuple when executing one set of SHMMA instructions. Each thread group may have operand buffers for operand A and operand C, e.g., buffer A and accumulator buffer, respectively. In addition, operand buffer (e.g., buffer B) for operand B can store data shared by two thread groups in the same work tuple. An existing buffer B only needs to hold 4×8 FP16 numbers as an octet unit loads a 4×8 tile in each set of the HMMA instructions. In some embodiments, buffer size of buffer B may be doubled, which can accommodate four rows of operand B. Buffer B can be a ping-pong buffer, having one part which can be read by DP and another part which is loading data from the memory (e.g., register file 11011). In some embodiments, operand A in buffer A can be broadcasted to the four DP units it connects to so that all DP units in an octet unit can read the same row of operand A. Therefore, a thread group can compute dot products of a row of operand A and four columns of operand B per clock cycle.

Figure 12:
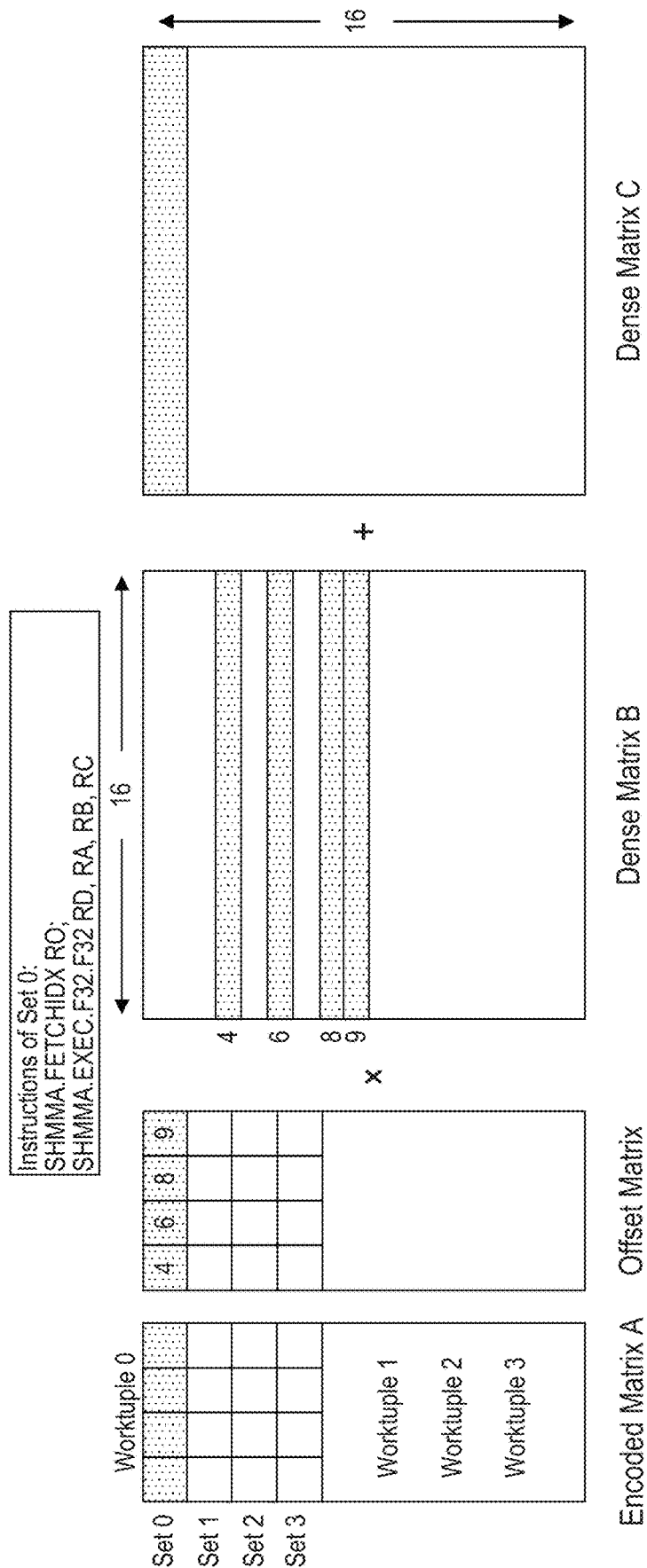
FIG. 12 is a schematic representation of an exemplary Sparse Warp Matrix Multiply and Accumulate (SWMMA) execution flow, according to some embodiments of the present disclosure.

FIG. 12 illustrates a schematic representation of an exemplary SWMMA execution flow, according to some embodiments of the present disclosure. The exemplary SWMMA execution flow can be implemented by processor 800 of FIG. 8 or processor 1100 of FIG. 11. The SWMMA can be performed with SHMMA instructions.

As shown in FIG. 12, matrix A may be vector-wise encoded into a 16×4 matrix with associated 16×4 offset matrix (L=16 and K=4). Four rows of the encoded matrix A can be mapped to one work tuple. Worktuple i computes row 4i to row 4i+3. For example, in execution of instructions of Set 0, the first row of offset matrix may be fetched and decoded, which contains 4 elements, 4, 6, 8 and 9. Corresponding rows in dense matrix B (e.g., row 4, row 6, row 8 and row 9) may be fetched and multiplied with first row of encoded matrix A. Results of the multiplication may be accumulated with first row of dense matrix C. Since all the offsets in offset matrix are in the range [0, 15], each offset may require 4 bits in memory. Therefore, each row of the encoded matrix A may require 16 bits to store the 4 offsets, which can be stored in one register.

EXAMPLE

Multiple simulations were developed and executed in order to demonstrate potential efficiency gains by using the disclosed techniques for executing neural networks. The simulations are performed on five popular neural networks in three domains: image classification, image captioning, and machine translation. The neural networks are trained with the existing generic sparsifying method and vector-wise sparsifying methods disclosed in present disclosure. The training was done on a single DGX-1 station with four NVIDIA Tesla V100 GPUs. The matrix multiplication was implementing using CUTLASS, an open-source high-performance GEMM template library.

For the image classification applications, four CNNs, AlexNet, VGG-16, ResNet-18, and ResNet-50, on the 2012 ImageNet Large Scale Visual Recognition Challenge (ImageNet ILSVRC-2012) dataset, are selected. For the image captioning applications, Show and Tell model are used, which includes an Inception V3 model with a Long Short-Term Memory (LSTM) layer attached to the last layer of the CNN. The LSTM layer has 512 cells by default. Show and Tell model was applied to the Microsoft® Common Objects in Context (MSCOCO) data set and the mini-batch size is set to 64. For the machine translation application, Neural Machine Translations (NMT) model is performed using an architecture with a 2-layer LSTM encoder, a 4-layer LSTM decoder, and an attention module. NMT was applied to the 2016 Conference on Machine Translation (WMT 16) English-German data set. BiLingual Evaluation Understudy (BLEU) score was used as the metric for NMT.

In examples, workloads were first trained with their default training methods to achieve reference model accuracy. Then vector-wise sparsifying methods were applied to reference dense models. FP32 was used for the weights, activations, and gradients in the training process and CUDA Core based inference kernels. For tensor core based kernels, FP32 weights and input activations were dynamically downsized to FP16 in each layer to avoid accuracy loss. The output activations are still in FP32.

In vector-wise sparsifying methods according to embodiments of present disclosure, vector size L is introduced. Table 1 shows accuracy comparisons of a CNN and a RNN between generic sparsifying and the vector-wise sparsifying, where Generic referring to generic sparsifying, VectorSparse referring to the examples disclosed herein.

TABLE 1

| Model | Sparsity | Sparsifying Method | Accuracy |
|---|---|---|---|
| VGG-16 | 75% | Generic | 68.6% |
| | | VectorSparse, L = 64 | 68.4% |
| | | VectorSparse, L = 32 | 68.3% |
| | | VectorSparse, L = 16 | 68.3% |
| | | VectorSparse, L = 8 | 66.3% |

| Model | Sparsity | Sparsifying Method | BLEU |
|---|---|---|---|
| Show and Tell | 75% | Generic | 31.1 |
| | | VectorSparse, L = 64 | 31.0 |
| | | VectorSparse, L = 32 | 30.9 |
| | | VectorSparse, L = 16 | 30.9 |
| | | VectorSparse, L = 8 | 30.4 |

As shown in Table 1, each weight matrix was sparsified with four L configurations: 8, 16, 32, and 64. Although only the result of 75% sparsity is shown, without loss of generality, various sparsities were explored. It turns out that large vector size (e.g., L≥16) may have a marginal impact on the accuracy, regardless of the sparsity. Small vector size (e.g., L=8) may, in some cases, lead to a significant accuracy drop. Since the accuracy is insensitive to larger vector size in some embodiments, L=16 can be selected as a preferable size, which requires 4 bits for storing the offset indices and enables finer-grained tiling strategies. With 75% sparsity and L=16, the accuracy drop from vector-wise sparsifying was within 1% in these examples.

Figure 13:
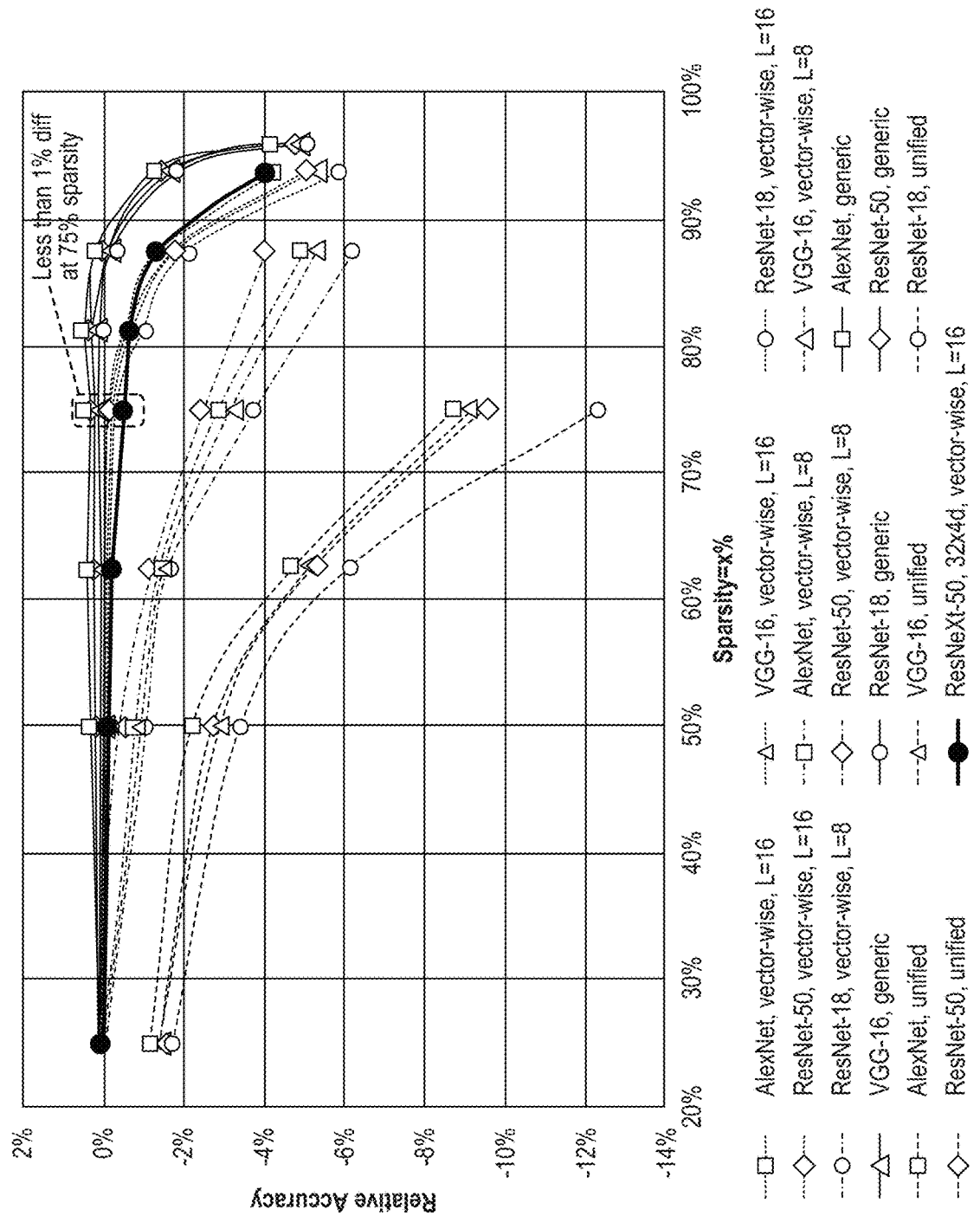
FIG. 13 is a graphical depiction of accuracy vs. sparsity in weight matrices of convolutional neural network (CNN) workloads, according to some embodiments of the present disclosure.
Figure 14:
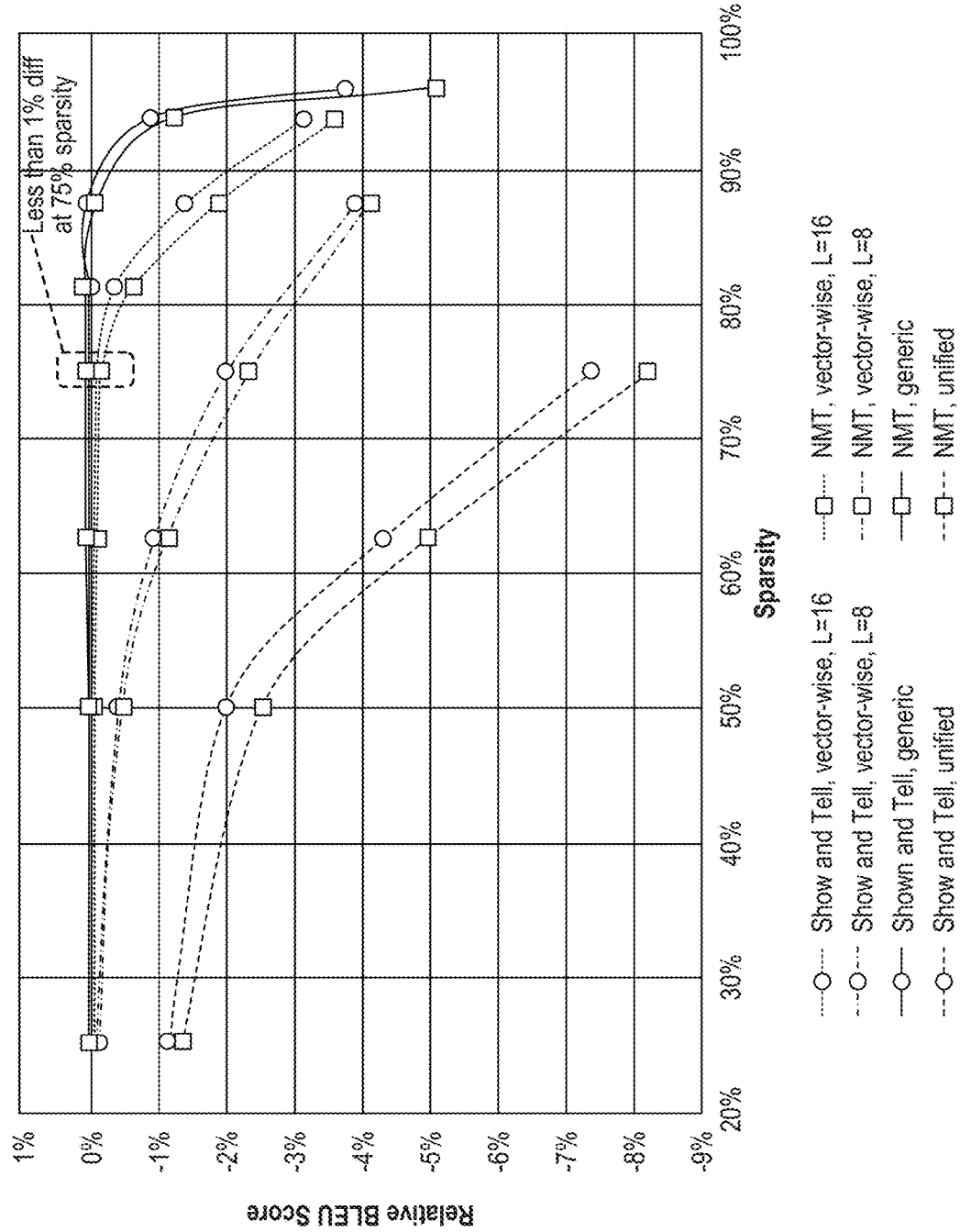
FIG. 14 is a graphical depiction of BiLingual Evaluation Understudy (BLEU) score vs. sparsity in weight matrices of recurrent neural network (RNN) workloads, according to some embodiments of the present disclosure.

FIG. 13 illustrates a graphical depiction of accuracy vs. sparsity in weight matrices of CNN workloads, and FIG. 14 illustrates a graphical depiction of BLEU score vs. sparsity in weight matrices of RNN workloads, according to some embodiments of the present disclosure. In FIGS. 13-14, CNN and RNN models are sparsified by vector-wise sparsifying methods with L=8 and 16, generic sparsifying method, and unified sparsifying method, respectively.

As illustrated in FIG. 13, all CNN models vector-wise sparsified with L=16 can retain their accuracy until the sparsity reaches 80%. Similarly, as shown in FIG. 14, the accuracy of the RNNs is comparable to the reference model when the sparsity does not exceed 75%. If vector size L is set to 8, the model accuracy drops more quickly than that of L=16. At the point of 75% sparsity, the L=8 scheme may suffer more than 2% accuracy loss. This is because L=8 may place too much spatial constraint on the element removal. FIGS. 13-14 show that RNNs may be more resilient to the L=8 pruning than the CNNs. However, their accuracy of L=8 sparsifying may still be incomparable to that of L=16. Therefore, there may demonstrate a trade-off between sparsity and accuracy. Given a vector size L, higher sparsity can achieve better performance by sacrificing the accuracy. It is appreciated that the trade-off can be done in accordance with specific application. Additionally, in comparison with unified sparsifying, vector-wise sparsifying has more flexibility on pruning weights so that it can result in a similar topology to generic sparsifying when L is not extremely small. For example, with L=16 vector-wise sparsifying, 75% sparsity may be good enough to assure the accuracy. Therefore, 4 non-zero elements are kept in each 16-dimensional vector. Since warp size 32 is a multiple of $16^5$, L=16 is also favorable for CUDA Cores.

Figure 15:
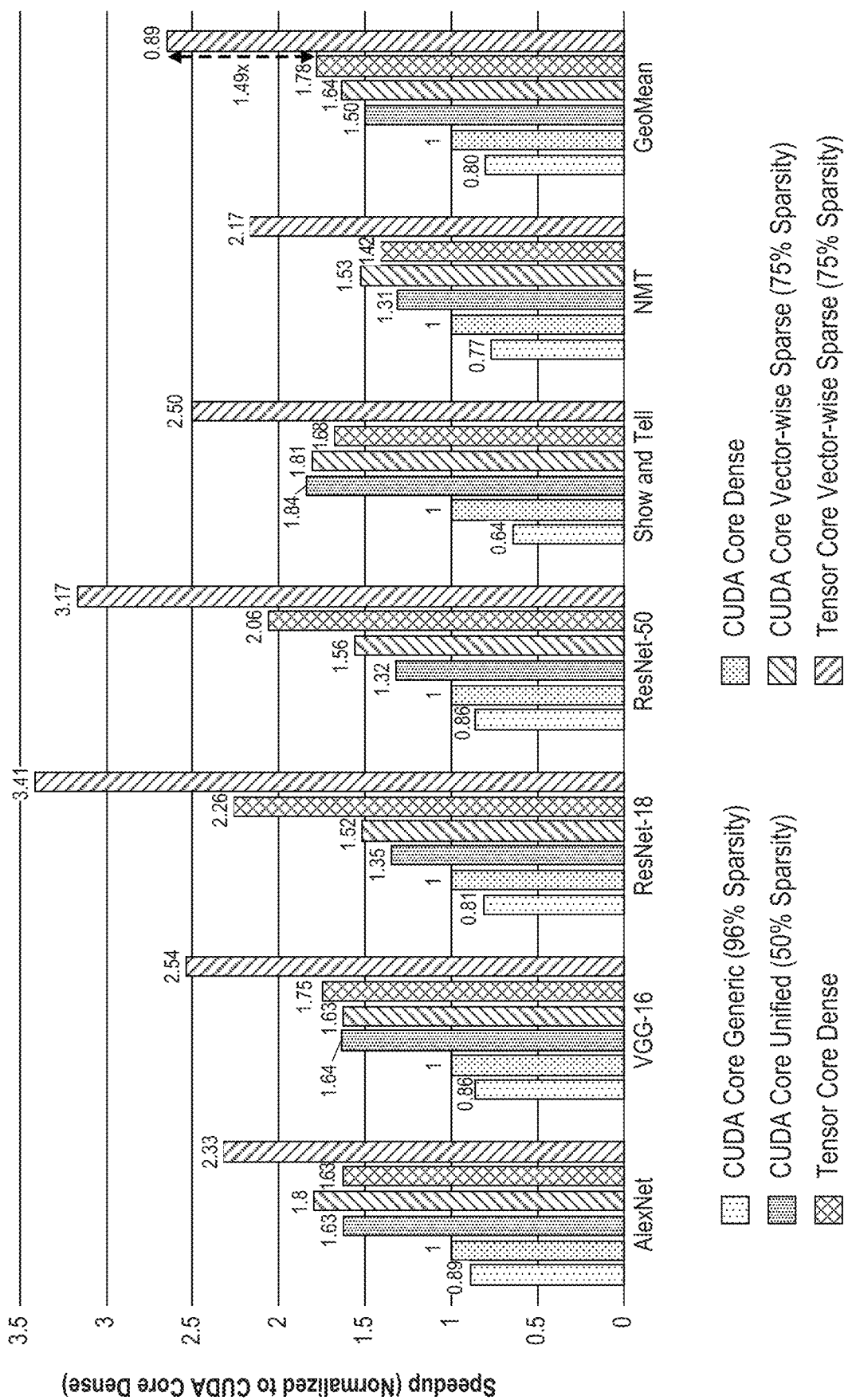
FIG. 15 is a graphical depiction of normalized speedup over Compute Unified Device Architecture (CUDA) Core based dense neural networks, according to some embodiments of the present disclosure

FIG. 15 illustrates a graphical depiction of normalized speedup over CUDA Core based dense neural networks, according to some embodiments of the present disclosure. In FIG. 15, CUDA Core Dense refers to dense NNs running on CUDA Core which is used as a baseline, CUDA Core Generic refers to generic sparsified NNs running on CUDA Core, CUDA Core Unified refers to unified sparsified NNs running on CUDA Core, CUDA Core Vector-wise Sparse refers to vector-wise sparsified NNs running on CUDA Core, Tensor Core Dense refers to dense NNs running on tensor core, and Tensor Core Vector-wise Sparse refers to vector-wise sparsified NNs running on tensor core according to embodiments of present disclosure (e.g., 1105 of FIG. 11). Vector-wise sparsified NNs have 75% sparsity, generic sparsified NNs have 96% sparsity, and unified sparsified NNs have 50% sparsity. All results are normalized to CUDA Core Dense.

As shown in FIG. 15, Tensor Core Dense is faster than CUDA Core Dense, and CUDA Core Generic is 20% slower than CUDA Core Dense. Alternatively, CUDA Core Unified on average has 1.50× speedup over CUDA Core Dense. On average, Tensor Core Vector-wise Sparse can achieve 2.65× speedup over the baseline Tensor Core Dense. Cause of the performance gain may be: first, with a relaxed spatial constraint, vector-wise sparsified NNs benefit from high sparsity so that CUDA Core Vector-wise Sparse has 64% performance gain than the baseline; secondly, with disclosed SHMMA instructions and architecture, these vector-wise sparsified NNs can take advantage of powerful tensor core, which can contribute an additional 61% performance improvement versus the CUDA Core Vector-wise Sparse. In addition, Tensor Core Vector-wise Sparse has 1.49× speedup over Tensor Core Dense.

In vector-wise sparse mode, the core (e.g., tensor core 1105 of FIG. 11) according to embodiments of present disclosure may requires a 4× large buffer (e.g., buffer B) for operand B to hold 4×16 FP16 numbers and enable the ping-pong buffer. In addition, an offset register may be added for each octet unit. The existing size of buffer B in each octet unit is 512B (=4×8×16 B), and each core has two octet units, resulting in a buffer size of 1 KB. Therefore, vector-wise sparse mode may require a 4 KB buffer B. If a processor (e.g., processor 800 of FIG. 8 or processor 1100 of FIG. 11) has 8 cores, it may need a 4 KB buffer.

TABLE 2

| Process | SRAM Size | Area | Cycle Time |
|---|---|---|---|
| 22 nm | 4 KB | 0.019 mm² (0.069 × 0.275) | 0.4 ns |

Table 2 shows design overhead analysis via CACTI 7. A 4 KB Static Random-Access Memory (SRAM) takes 0.019 mm² at 22 nm process node. The 0.4 ns cycle time is smaller than NVIDIA Tesla V100 GPU's nominal cycle period (0.65 ns at 1530 MHz), which does not incur any timing overhead. As V100 GPU is fabricated in 12 nm, the area is scaled down to 0.007 mm². In addition, if a core (e.g., tensor core 1105 of FIG. 11) needs two extra registers as the offset register for two octets, a processor needs 16 extra offset registers to fetch the operands to buffer B. Given V100 GPU's area is 815 mm², the overall area overhead may be negligible.

Embodiments of the present disclosure can be applied to many products, environments, and scenarios. For example, some embodiments of the present disclosure can be applied to a processor (such as CPU), Ali-NPU (e.g., Hanguang NPU), Ali-Cloud, Ali PIM-AI (Processor-in Memory for AI), Ali-DPU (Database Acceleration Unit), Ali-AI platform, GPU, TPU, or the like.

The embodiments may further be described using the following clauses:

1. A method for providing vector-wise sparsity in a neural network, comprising:
dividing a matrix associated with the neural network into a plurality of vectors;
selecting a first subset of non-zero elements from the plurality of vectors to form a pruned matrix; and
outputting the pruned matrix for executing the neural network using the pruned matrix.

2. The method of clause 1, further comprising:
padding a residual vector of the plurality of vectors using zeroes.

3. The method of clause 1 or 2, further comprising:
re-training the neural network using the pruned matrix.

4. The method of clause 3, wherein the re-training includes at least one of modifying one or more elements of the pruned matrix or modifying one or more activation functions of one or more nodes of the neural network.

5. The method of clause 3 or 4, further comprising iteratively performing:
selecting a second subset of non-zero elements from the plurality of vectors to form a second pruned matrix; and
re-training the neural network using the second pruned matrix.

6. The method of clause 5, wherein selecting the first subset of non-zero elements further comprises selecting a predetermined number of largest non-zero elements from each vector of the plurality of vectors.

7. The method of clause 6, wherein selecting a second subset of non-zero elements further comprises:
decreasing the predetermined number; and
selecting the decreased predetermined number of largest non-zero elements from each vector of the plurality of vectors.

8. The method of any one of clauses 5-7, further comprising:
halting the iteration if an accuracy of the re-trained neural network is below a threshold.

9. The method of any one of clauses 1-8, wherein the selecting a subset of non-zero elements comprises zeroing non-zero elements not selected in each vector of the plurality of vectors.

10. The method of any one of clauses 1-9, further comprising:
encoding the selected subset of non-zero elements as compact vectors with associated offsets of the selected subset of non-zero elements within the one or more vectors.

11. The method of clause 10, wherein the compact vector has a predetermined length, and encoding the selected subset of non-zero elements further comprises:
if there are fewer selected non-zero elements for a compact vector than the predetermined length, padding an element other than selected non-zero elements in the compact vector with zero.

12. The method of clause 10 or 11, further comprising:
fetching the offsets;
performing a matrix multiplication of the compact vectors and a matrix by multiplying elements in the compact vectors associated with the fetched offsets and elements in the matrix corresponding with the fetched offsets.

13. The method of any of clauses 1-12, wherein the matrix is a weight matrix.

14. A system for providing vector-wise sparsity in a neural network, comprising:
at least one memory for storing instructions; and
at least one processor to execute the instructions to cause the system to perform:
dividing a matrix associated with the neural network into a plurality of vectors;
selecting a first subset of non-zero elements from the plurality of vectors to form a pruned matrix; and
outputting the pruned matrix for executing the neural network using the pruned matrix.

15. The system of clause 14, wherein the at least one processor further executes the instructions to cause the system to perform padding a residual vector of the plurality of vectors using zeroes.

16. The system of clause 14 or 15, wherein the at least one processor further executes the instructions to cause the system to perform re-training the neural network using the pruned matrix.

17. The system of clause 16, wherein the at least one processor further executes the instructions to cause the system to perform at least one of modifying one or more elements of the pruned matrix or modifying one or more activation functions of one or more nodes of the neural network.

18. The system of clause 16 or clause 17, wherein the at least one processor further executes the instructions to cause the system to iteratively perform:
selecting a second subset of non-zero elements from the plurality of vectors to form a second pruned matrix; and
re-training the neural network using the second pruned matrix.

19. The system of clause 18, wherein the at least one processor further executes the instructions to cause the system to perform selecting a predetermined number of largest non-zero elements from each vector of the plurality of vectors.

20. The system of clause 19, wherein the at least one processor further executes the instructions to cause the system to perform:
decreasing the predetermined number; and
selecting the decreased predetermined number of largest non-zero elements from each vector of the plurality of vectors.

21. The system of any one of clauses 18-20, wherein the at least one processor further executes the instructions to cause the system to perform halting the iteration if an accuracy of the re-trained neural network is below a threshold.

22. The system of any one of clauses 14-21, wherein the at least one processor further executes the instructions to cause the system to perform zeroing non-zero elements not selected in each vector of the plurality of vectors.

23. The system of any one of clauses 14-22, wherein the at least one processor further executes the instructions to cause the system to perform encoding the selected subset of non-zero elements as compact vectors with associated offsets of the selected subset of non-zero elements within the one or more vectors.

24. The system of clause 23, wherein the compact vector has a predetermined length, and the at least one processor further executes the instructions to cause the system to perform:
if there are fewer selected non-zero elements for a compact vector than the predetermined length, padding an element other than selected non-zero elements in the compact vector with zero.

25. The system of clause 23 or 24, wherein the at least one processor to execute the instructions to cause the system to perform:

fetching the offsets;
performing a matrix multiplication of the compact vectors and a matrix by multiplying elements in the compact vectors associated with the fetched offsets and elements in the matrix corresponding with the fetched offsets.

26. The system of any of clauses 14-25, wherein the matrix is a weight matrix.

27. A non-transitory computer-readable storage medium storing a set of instructions that is executable by at least one processor to cause the computer to perform a method for providing vector-wise sparsity in a neural network, the method comprising:
dividing a matrix associated with the neural network into a plurality of vectors;
selecting a first subset of non-zero elements from the plurality of vectors to form a pruned matrix; and
outputting the pruned matrix for executing the neural network using the pruned matrix.

28. The non-transitory computer-readable storage medium of clause 27, wherein the set of instructions that is executable by the at least one processor causes the computer to further perform:
padding a residual vector of the plurality of vectors using zeroes.

29. The non-transitory computer-readable storage medium of clause 27 or 28, wherein the set of instructions that is executable by the at least one processor causes the computer to further perform:
re-training the neural network using the pruned matrix.

30. The non-transitory computer-readable storage medium of clause 29, wherein the re-training includes at least one of modifying one or more elements of the pruned matrix or modifying one or more activation functions of one or more nodes of the neural network.

31. The non-transitory computer-readable storage medium of clause 29 or 30, wherein the set of instructions that is executable by the at least one processor causes the computer to perform iteratively:
selecting a second subset of non-zero elements from the plurality of vectors to form a second pruned matrix; and
re-training the neural network using the second pruned matrix.

32. The non-transitory computer-readable storage medium of clause 31, wherein selecting the first subset of non-zero elements further comprises selecting a predetermined number of largest non-zero elements from each vector of the plurality of vectors.

33. The non-transitory computer-readable storage medium of clause 32, wherein selecting a second subset of non-zero elements further comprises:
decreasing the predetermined number; and
selecting the decreased predetermined number of largest non-zero elements from each vector of the plurality of vectors.

34. The non-transitory computer-readable storage medium of any one of clauses 31-33, wherein the set of instructions that is executable by the at least one processor causes the computer to further perform:
halting the iteration if an accuracy of the re-trained neural network is below a threshold.

35. The non-transitory computer-readable storage medium of any one of clauses 27-35, wherein the selecting a subset of non-zero elements comprises zeroing non-zero elements not selected in each vector of the plurality of vectors.

36. The non-transitory computer-readable storage medium of any one of clauses 27-35, wherein the set of instructions that is executable by the at least one processor causes the computer to further perform:
encoding the selected subset of non-zero elements as compact vectors with associated offsets of the selected subset of non-zero elements within the one or more vectors.

37. The non-transitory computer-readable storage medium of clause 36, wherein the compact vector has a predetermined length, and encoding the selected subset of non-zero elements further comprises:
if there are fewer selected non-zero elements for a compact vector than the predetermined length, padding an element other than selected non-zero elements in the compact vector with zero.

38. The non-transitory computer-readable storage medium of clause 36 or 37, wherein the set of instructions that is executable by the at least one processor causes the computer to further perform:
fetching the offsets;
performing a matrix multiplication of the compact vectors and a matrix by multiplying elements in the compact vectors associated with the fetched offsets and elements in the matrix corresponding with the fetched offsets.

39. The non-transitory computer-readable storage medium of any of clauses 27-38, wherein the matrix is a weight matrix.

40. A processor for executing a neural network, comprising:
a memory for storing associated offsets of elements of compact vectors within original vectors; and
at least one core configured to decode offsets of elements of a first plurality of compact vectors and perform a matrix multiplication of a first operand and a second operand based on the decoded offsets, the first operand comprising the first plurality of compact vectors.

41. The processor of clause 40, wherein the at least one core is configured to determine which rows or columns of the second operand to fetch.

42. The processor of clause 41, wherein the at least one core is further configured to perform multiplication of the plurality of compact vectors of the first operand with corresponding fetched rows or columns of the second operand.

43. The processor of clause 40, further comprising: a plurality of operand buses comprising a first operand bus connected to the at least one core to provide the first operand and a second operand bus connected to the at least one core to provide the second operand.

44. The processor of clause 43, wherein each of the at least one core comprises:
one or more groups of processing units, each group of processing units corresponding to a thread group;
a first buffer connected to the first operand bus and a first group of processing units; and
a second buffer connected to the second operand bus and at least one of the one or more groups of processing units.

45. The processor of clause 44, wherein the second buffer comprises a first part for storing data to be read by the process unit and a second part for loading data from the register file.

46. The processor of clause 44, wherein the processing unit is dot product (DP) unit.

47. The processor of clause 44, wherein each of the at least one core further comprises a multiplexer connected between the second operand bus and the second buffer.

48. The processor of clause 44, wherein each of the at least one core comprises:

a third buffer connected to a third operand bus and the first group of processing units, and wherein the at least one core is to accumulate a result of the matrix multiplication of the first operand and the second operand with a third operand from a third operand bus.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for providing vector-wise sparsity in a neural network, comprising:
    training the neural network by applying a training data set to the neural network, wherein the neural network comprises an input layer and is configured to perform image recognition, facial recognition, translation, or 3D modeling using input received at the input layer;
    dividing a matrix associated with the trained neural network into a plurality of vectors;
    selecting a first subset of non-zero elements from the plurality of vectors to form a pruned matrix by selecting a predetermined number of non-zero elements in each vector;
    re-training the trained neural network using the pruned matrix to reduce one or more associated loss functions by modifying one or more elements of the pruned matrix or modifying one or more activation functions of one or more nodes of the neural network; and
    in response to a preset sparsity level being reached, outputting the pruned matrix for executing the re-trained neural network using the pruned matrix.

2. The method of claim 1, further comprising:
    padding a residual vector of the plurality of vectors using zeroes.

3. The method of claim 1, further comprising iteratively performing:
    selecting a second subset of non-zero elements from the plurality of vectors to form a second pruned matrix; and
    re-training the trained neural network using the second pruned matrix.

4. The method of claim 3, wherein selecting the first subset of non-zero elements further comprises selecting a predetermined number of largest non-zero elements from each vector of the plurality of vectors.

5. The method of claim 4, wherein selecting a second subset of non-zero elements further comprises:
    decreasing the predetermined number; and
    selecting the decreased predetermined number of largest non-zero elements from each vector of the plurality of vectors.

6. The method of claim 4, further comprising:
    halting the iteration if an accuracy of the neural network re-trained using the second pruned matrix is below a threshold.

7. The method of claim 1, further comprising:
    encoding the selected subset of non-zero elements as compact vectors with associated offsets of the selected subset of non-zero elements within the one or more vectors.

8. A system for providing vector-wise sparsity in a neural network, comprising:
   at least one memory for storing instructions; and
   at least one processor to execute the instructions to cause the system to perform:
      training the neural network by applying a training data set to the neural network, wherein the neural network comprises an input layer and is configured to perform image recognition, facial recognition, translation, or 3D modeling using input received at the input layer;
      dividing a matrix associated with the trained neural network into a plurality of vectors;
      selecting a first subset of non-zero elements from the plurality of vectors to form a pruned matrix by selecting a predetermined number of non-zero elements in each vector;
      re-training the trained neural network using the pruned matrix to reduce one or more associated loss functions by modifying one or more elements of the pruned matrix or modifying one or more activation functions of one or more nodes of the neural network; and
      in response to a preset sparsity level being reached, outputting the pruned matrix for executing the re-trained neural network using the pruned matrix.

9. The system of claim 8, wherein the at least one processor further executes the instructions to cause the system to perform encoding the selected subset of non-zero elements as compact vectors with associated offsets of the selected subset of non-zero elements within the one or more vectors.

10. A non-transitory computer-readable storage medium storing a set of instructions that is executable by at least one processor to cause the computer to perform a method for providing vector-wise sparsity in a neural network, the method comprising:
   training the neural network by applying a training data set to the neural network, wherein the neural network comprises an input layer and is configured to perform image recognition, facial recognition, translation, or 3D modeling using input received at the input layer;
   dividing a matrix associated with the trained neural network into a plurality of vectors;
   selecting a first subset of non-zero elements from the plurality of vectors to form a pruned matrix by selecting a predetermined number of non-zero elements in each vector;
   re-training the trained neural network using the pruned matrix to reduce one or more associated loss functions by modifying one or more elements of the pruned matrix or modifying one or more activation functions of one or more nodes of the neural network; and
   in response to a preset sparsity level being reached, outputting the pruned matrix for executing the re-trained neural network using the pruned matrix.

11. The non-transitory computer-readable storage medium of claim 10, wherein the set of instructions that is executable by the at least one processor causes the computer to perform iteratively:
   selecting a second subset of non-zero elements from the plurality of vectors to form a second pruned matrix; and
   re-training the trained neural network using the second pruned matrix.

12. The non-transitory computer-readable storage medium of claim 11, wherein selecting the first subset of non-zero elements further comprises selecting a predetermined number of largest non-zero elements from each vector of the plurality of vectors, and wherein selecting a second subset of non-zero elements further comprises:
   decreasing the predetermined number; and
   selecting the decreased predetermined number of largest non-zero elements from each vector of the plurality of vectors.

13. The non-transitory computer-readable storage medium of claim 12, wherein the set of instructions that is executable by the at least one processor causes the computer to further perform:
   halting the iteration if an accuracy of the neural network re-trained using the second pruned matrix is below a threshold.

14. The non-transitory computer-readable storage medium of claim 10, wherein the set of instructions that is executable by the at least one processor causes the computer to further perform:
   encoding the selected subset of non-zero elements as compact vectors with associated offsets of the selected subset of non-zero elements within the one or more vectors.

15. The system of claim 8, wherein the at least one processor comprises one or more subcores, and a unified level 1 data cache and shared memory shared among the one or more subcores to divide the matrix into the plurality of vectors.

* * * * *